US011960760B2

(12) United States Patent
Calfee et al.

(10) Patent No.: US 11,960,760 B2
(45) Date of Patent: Apr. 16, 2024

(54) SEEK SCHEDULING IN A SPLIT ACTUATOR DRIVE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Gary W. Calfee, Santa Clara, CA (US); Richard M. Ehrlich, Saratoga, CA (US); Thorsten Schmidt, Livermore, CA (US); Eric R. Dunn, Cupertino, CA (US)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/317,836

(22) Filed: May 15, 2023

(65) Prior Publication Data
US 2023/0280935 A1    Sep. 7, 2023

Related U.S. Application Data

(63) Continuation of application No. 16/589,091, filed on Sep. 30, 2019, now abandoned.

(51) Int. Cl.
*G06F 3/06* (2006.01)

(52) U.S. Cl.
CPC .......... *G06F 3/0655* (2013.01); *G06F 3/0604* (2013.01); *G06F 3/0676* (2013.01)

(58) Field of Classification Search
None
See application file for complete search history.

(56) References Cited

U.S. PATENT DOCUMENTS

| 5,355,486 | A | 10/1994 | Cornaby |
| 6,437,937 | B1 | 8/2002 | Guo et al. |
| 6,560,075 | B2 | 5/2003 | Price et al. |
| 7,385,781 | B1 | 6/2008 | Craig et al. |
| 7,710,683 | B2 | 5/2010 | Craig et al. |
| 8,804,266 | B2 | 8/2014 | Hanya et al. |
| 10,049,691 | B1 | 8/2018 | Gaertner et al. |
| 10,192,576 | B1 | 1/2019 | Gaertner et al. |
| 10,741,210 | B1 | 8/2020 | Hillukka et al. |
| 10,839,839 | B1 | 11/2020 | Uchida et al. |

*Primary Examiner* — Michael Alsip
(74) *Attorney, Agent, or Firm* — Kim & Stewart LLP

(57) ABSTRACT

Systems and methods for scheduling the execution of disk access commands in a split-actuator hard disk drive are provided. In some embodiments, while a first actuator of the split actuator is in the process of performing a first disk access command (a victim operation), a second disk access command (an aggressor operation) is selected for and executed by a second actuator of the split actuator. The aggressor operation is selected from a queue of disk access commands for the second actuator, and is selected based on being the disk access command in the queue that can be initiated sooner than any other disk access command in the queue without disturbing the victim operation.

20 Claims, 19 Drawing Sheets

SEEK SCHEDULING IN A SPLIT ACTUATOR DRIVE

CROSS-REFERENCE TO RELATED APPLICATION

This application is a continuation of U.S. patent application Ser. No. 16/589,091, filed Sep. 30, 2019, the entire contents of which are incorporated herein by reference.

BACKGROUND

Magnetic hard disk drives (HDDs) have been employed in information technology as a low-cost means for providing random access to large quantities of data. As the need for data storage has expanded, the areal density of information stored in HDDs has been continuously increased. In addition to high storage capacity, the ability of an HDD to access stored data quickly is also important. To meet the ever-increasing requirements for high access performance and faster throughput, HDDs have been configured with multiple rotary actuators and associated read/write channels that are designed to operate simultaneously. Thus, each rotary actuator enables the independent positioning of one or more magnetic heads for reading and writing data, thereby greatly increasing the throughput of such HDDs.

One drawback to the use of independent rotary actuators is that the mechanical interaction between such actuators can affect positioning accuracy of a magnetic head that is associated with one actuator when another actuator is in motion. For example, when one actuator is seeking to a targeted data track, the high accelerations and changes in acceleration of the actuator can generate vibrations which will significantly affect the positioning accuracy of another actuator while the other actuator is track following. Consequently, there is a need in the art for reducing the effect of one actuator in a multi-actuator drive on the positioning accuracy of another actuator in the multi-actuator drive.

SUMMARY

One or more embodiments provide systems and methods for scheduling the execution of disk access commands in a split-actuator hard disk drive (HDD). In some embodiments, while a first actuator of the split actuator is in the process of performing a first disk access command (a so-called "victim" operation), a second disk access command (a so-called "aggressor" operation) is selected for and executed by a second actuator of the split actuator. The aggressor operation is selected from a queue of disk access commands for the second actuator, and is selected based on being the disk access command in the queue that can be initiated sooner than any other disk access command in the queue without disturbing the victim operation. In some situations, the aggressor operation is modified to prevent disturbance of the victim operation, including reducing a rate of change of radial acceleration of the second actuator during a seek portion of the aggressor operation. Additionally, in some situations, to determine the best aggressor operation to select for execution, a time interval sufficient for a revolution of a recording medium to occur is added to the associated time of the aggressor operation when comparing to the associated times of other possible aggressor operations.

In some embodiments, a first disk access command for a first actuator of the split actuator and a second disk access command for a second actuator of the split actuator are selected simultaneously. The first disk access command is selected from a queue of commands for the first actuator and the second disk access command is selected from a queue of commands for the second actuator, where the selection of the first and second disk access commands is based on an approximate matching of a value for each command of a timing metric associated with execution of the commands. The first disk access command and the second disk access command are then executed together, so that the first actuator and the second actuator are seeking at substantially the same time. Thus, the high accelerations and changes in acceleration that occur during seeking of one actuator do not occur while the other actuator is track following and is most easily disturbed.

According to an embodiment, a method is provided of selecting and executing disk access commands in a disk drive that includes a first actuator that controls an arm having a first head and a second actuator that controls an arm having a second head. According to the embodiment, the method comprises, while the first actuator is in the process of performing a first disk access operation, selecting a second disk access operation from a queue of operations to be performed by the second actuator; determining that a disturbance time of the second disk access operation coincides with at least a portion of a critical time of the first disk access operation; in response to determining that the disturbance time coincides with at least a portion of the critical time, generating a modified second disk access operation that does not include a disturbance time that coincides with at least a portion of the critical time of the first disk access operation; selecting as an operation for execution either the modified second disk access operation or a third disk access operation from the queue of operations to be performed by the second actuator; and executing the operation for execution.

A disk drive, according to another embodiment, comprises a first actuator that controls an arm having a first head and extending over a first surface of a plurality of disk surfaces; a second actuator that controls an arm having a second head and extending over a second surface of a plurality of disk surfaces other than the first surface; and a controller. The controller is configured to, while the first actuator is in the process of performing a first disk access operation, select a second disk access operation from a queue of operations to be performed by the second actuator; determine that a disturbance time of the second disk access operation coincides with at least a portion of a critical time of the first disk access operation; in response to determining that the disturbance time coincides with at least a portion of the critical time, generate a modified second disk access operation that does not include a disturbance time that coincides with at least a portion of the critical time of the first disk access operation; select as an operation for execution either the modified second disk access operation or a third disk access operation from the queue of operations to be performed by the second actuator; and execute the operation for execution.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
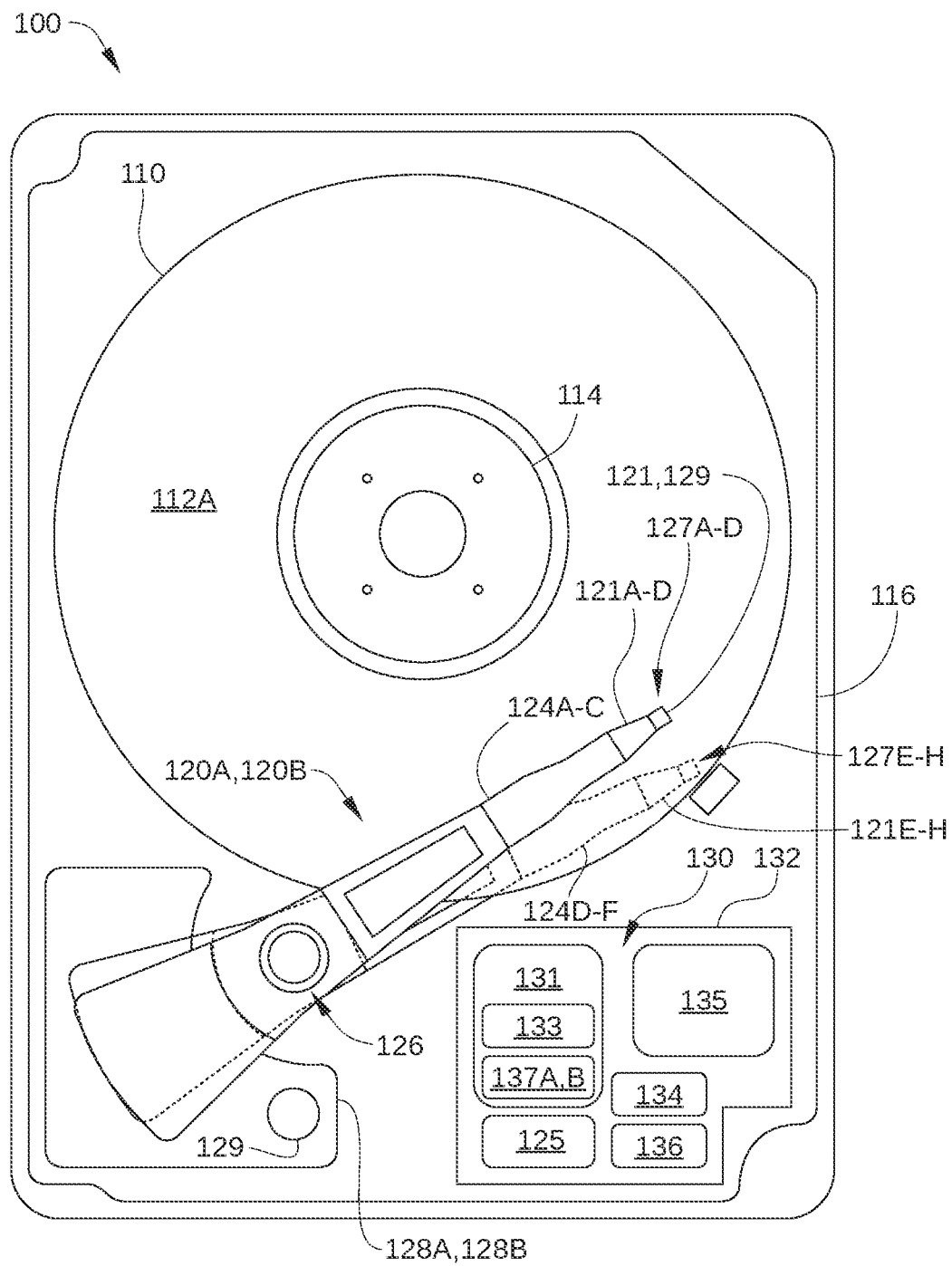
FIG. 1 is a schematic view of an exemplary hard disk drive, according to an embodiment.

FIG. 1 is a schematic view of an exemplary hard disk drive (HDD) 100, according to one embodiment. For clarity, HDD 100 is illustrated without a top cover. HDD 100 is a multiple actuator drive, and includes one or more storage disks 110, each including one or two recording surfaces on which a plurality of concentric data storage tracks are disposed. In FIG. 1, only the top recording surface 112A of storage disk 110 is visible. The one or more storage disks 110 are coupled to and rotated by a spindle motor 114 that is mounted on a base plate 116. Two or more actuator arm assemblies 120A and 120B are also mounted on base plate 116, and each of the assemblies includes one or more arm-mounted sliders with one or more magnetic read/write heads that read data from and write data to the data storage tracks of an associated recording surface, such as recording surface 112A.

One or more actuator arms 124A-C are included in actuator arm assembly 120A, and one or more actuator arms 124D-F are included in actuator arm assembly 120B. Actuator arm assembly 120A and the one or more actuator arms 124A-C included therein are rotated together about a bearing assembly 126 by a voice coil motor (VCM) 128A independently from actuator arm assembly 120B. Likewise, actuator arm assembly 120B and the one or more actuator arms 124D-F included therein are rotated together about bearing assembly 126 by a VCM 128B independently from actuator arm assembly 120A. Thus, each of VCMs 128A and 128B moves a group of the sliders radially relative to a respective recording surface of a storage disk 110 included in HDD 100, thereby providing radial positioning of a read/write head over a desired concentric data storage track. For example, VCM 128A moves sliders 121A-D relative to respective recording surfaces, thereby providing radial positioning of read/write head 127A over a desired concentric data storage track on recording surface 112A. Spindle motor 114, the read/write heads 127A-D and 127E-H, and VCMs 128A and 128B are coupled to electronic circuits 130, which are mounted on a printed circuit board 132.

When data are transferred to or from a particular recording surface of HDD 100, one of the actuator arm assemblies 120A or 120B moves in an arc between the inner diameter (ID) and the outer diameter (OD) of the storage disk 110. The actuator arm assembly accelerates in one angular direction when current is passed in one direction through the voice coil of the corresponding VCM and accelerates in an opposite direction when the current is reversed, thereby allowing control of the position of the actuator arm assembly and the attached read/write head with respect to the particular storage disk 110.

In the embodiment illustrated in FIG. 1, four sliders 121A-121-D, three actuator arms 124A-124C, and four read/write heads 127A-127D are shown for actuator arm assembly 120A and four sliders 121E-121H, three actuator arms 124D-124F, and four read/write heads 127E-127H are shown for actuator arm assembly 120B. In other embodiments, each of actuator arm assemblies 120A and 120B can include more or fewer actuator arms, sliders, and read/write heads. Further, in some embodiments, HDD 100 can include more than two actuator arm assemblies, each rotated about bearing assembly 126 by a respective VCM independently from each other.

Figure 2:
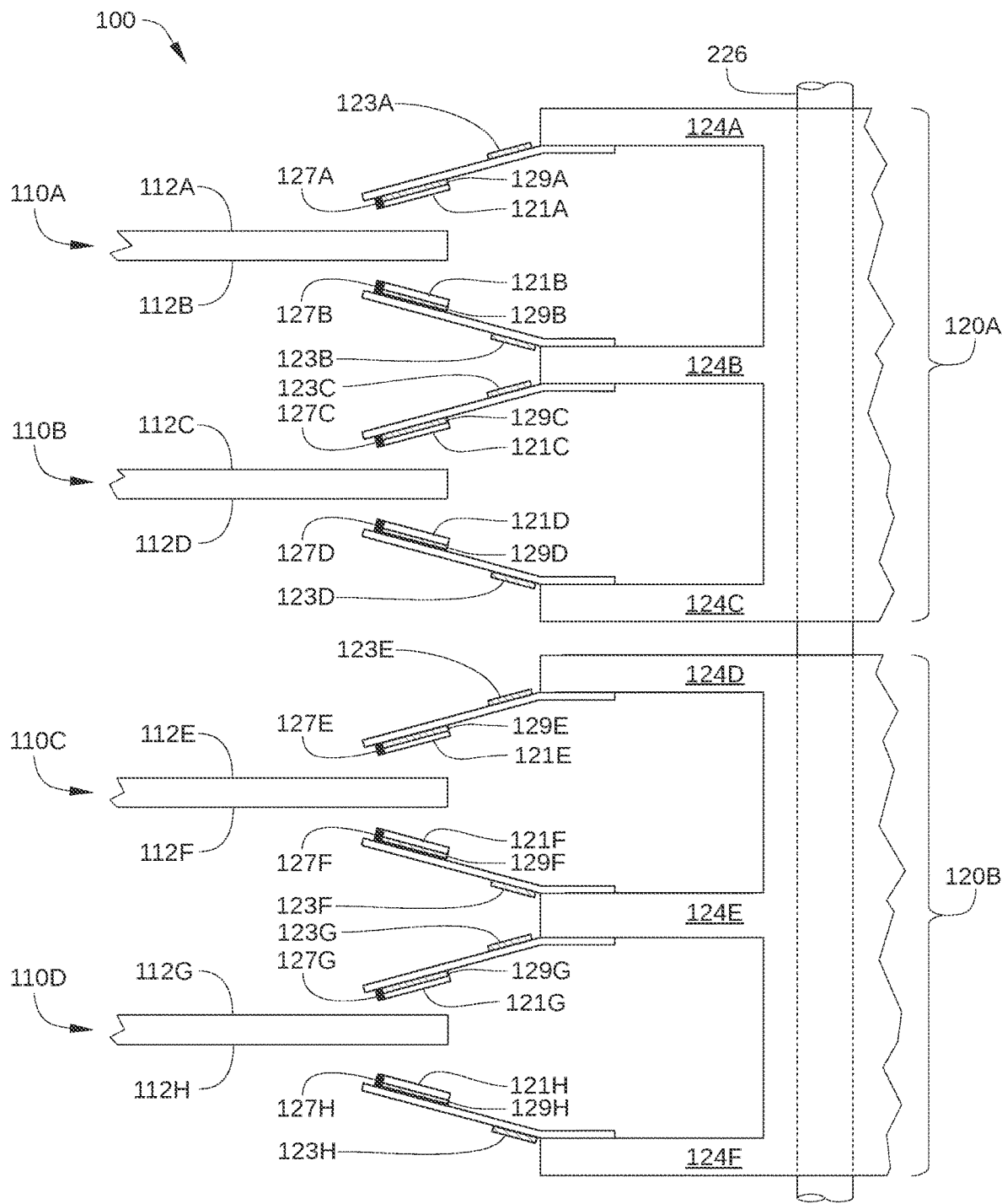
FIG. 2 schematically illustrates a partial side-view of multiple storage disks and two independent actuator arm assemblies of the hard disk drive of FIG. 1, according to an embodiment.

FIG. 2 schematically illustrates a partial side-view of multiple storage disks 110A-110D and two independent actuator arm assemblies 120A and 120B of HDD 100, according to an embodiment. The recording surfaces of multiple storage disks 110A and 110B are each accessed by one of the read/write heads included in the independent actuator arm assembly 120A (e.g., read/write heads 127A, 127B, 127C, and 127D), and the recording surfaces of multiple storage disks 110C and 110D are each accessed by the read/write heads included in the independent actuator arm assembly 120B (e.g., read/write heads 127E, 127F, 127G, and 127H). Thus, in the embodiment illustrated in FIG. 2, HDD 100 is configured with multiple storage disks 110A-110D having a total of eight recording surfaces 112A-112H and multiple read/write heads 127A-127H, each corresponding to one of these recording surfaces. Specifically, in the embodiment illustrated in FIG. 2, HDD 100 includes: a storage disk 110A with recording surfaces 112A and 112B; a storage disk 110B with recording surfaces 112C and 112D; a storage disk 110C with recording surfaces 112E and 112F; and a storage disk 110D with recording surfaces 112G and 112H. Thus, read/write head 127A reads data from and writes data to recording surface 112A, read/write head 127B reads data from and writes data to corresponding recording surface 112B, and so on.

Read/write heads 127A-127H are disposed on sliders 121A-121H, respectively, and sliders 121A-121H are mounted on actuator arms 124A-124C as shown. Actuator arms 124A-124C are included in actuator arm assembly 120A, and actuator arms 124D-124F are included in actuator arm assembly 120B. In an embodiment of the invention, actuator arm assemblies 120A and 120B are independently controlled and both rotate about bearing assembly 126 (which includes a same shaft axis 226). In some embodiments, actuator arms 120A and 120B rotate about different bearing assemblies (for example, arranged on opposite sides of the disks). In some embodiments, HDD 100 could include 4 actuator arms, with two sharing one bearing and two sharing another bearing.

In some embodiments, HDD 100 includes one or more microactuators for each of read/write heads 127A-127H. In the embodiment illustrated in FIG. 2, HDD 100 includes microactuators 129A-129H (collectively referred to herein as microactuators 129), each of which is associated with a respective read/write head 127A-127H, and/or microactuators 123A-123H (collectively referred to herein as microactuators 123), each of which is associated with a respective read/write head 127A-127H. Each of microactuators 129 and/or 123 compensates for perturbations in the radial position of sliders 121A-121H, so that read/write heads 127A-127H follow the proper data track on recording surfaces 112. Thus, microactuators 123 and/or 129 can compensate for vibrations of the disk, inertial events such as impacts to HDD 100, and irregularities in recording surfaces 112.

In some embodiments, each of sliders 121A-121H is mounted on a corresponding flexure arm via a microactuator 129. For example, a microactuator 129 can include a microactuator (MA) second stage that includes two lead zirconate titanate piezoelectric actuators attached to a baseplate of the corresponding flexure arm. Alternatively, in some embodiments, each of sliders 121A-121H is mounted directly on a corresponding flexure arm. Further, in some embodiments, each of microactuators 123 is disposed near a base of a respective flexure arm, i.e., proximate one of actuator arms 124A-124C. For example, microactuators 123 can each include a pair of piezoelectric strips that are mounted on the corresponding flexure arm near to where that flexure arm is attached to the corresponding actuator arm 124A-124C. When one such piezoelectric strip expands and the other piezoelectric strip contracts, the flexure arm sways to one side, moving a corresponding slider 121A-121H radially. Because the diameter of the circular arc along which the slider moves is approximately equal to the length of the flexure arm (which is generally larger than the length of the slider), microactuators 123 can provide significantly greater range of radial motion of a read/write head 127A-127H than microactuators 129.

Returning to FIG. 1, electronic circuits 130 include read channels 137A and 137B, a microprocessor-based controller 133, random-access memory (RAM) 134 (which may be a dynamic RAM and is used as one or more data buffers) and/or a flash memory device 135, and, in some embodiments, a flash manager device 136. In some embodiments, read channels 137A and 137B and microprocessor-based controller 133 are included in a single chip, such as a system-on-chip (SoC) 131. HDD 100 further includes a motor-driver chip 125 that accepts commands from microprocessor-based controller 133 and drives spindle motor 114, and VCMs 128A and 128B. Via a preamplifier (not shown), read/write channel 137A communicates with read/write heads 127A-D and read/write channel 137B communicates with read/write heads 127E-H. The preamplifier is mounted on a flex-cable, which is mounted on either base plate 116, one of actuator arms 124A-C or 124D-F, or both. Electronic circuits 130 and motor-driver chip 125 are described below in greater detail in conjunction with FIG. 3.

Figure 3:
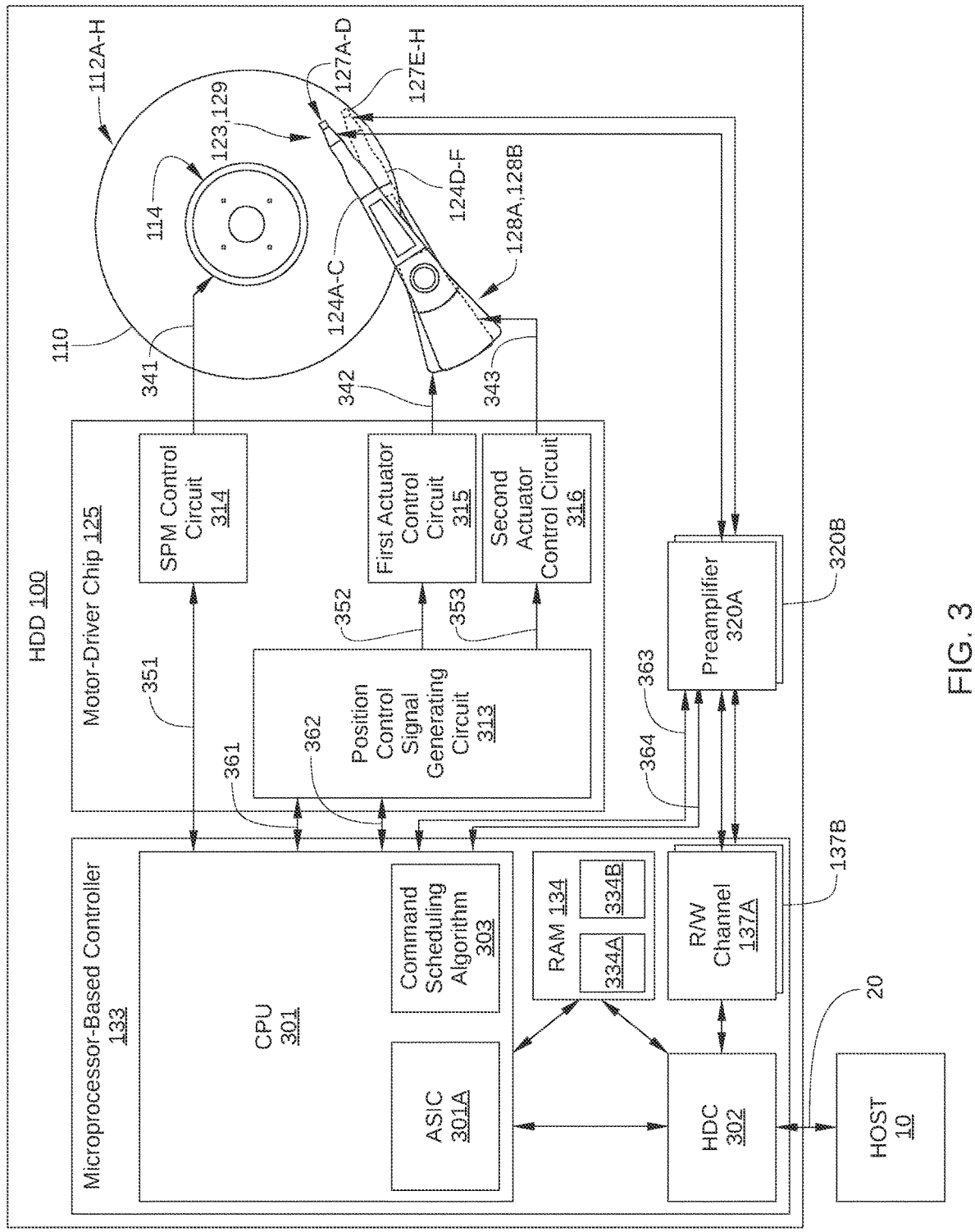
FIG. 3 illustrates an operational diagram of the hard disk drive of FIG. 1, with some elements of electronic circuits and a motor-driver chip shown configured according to one embodiment.

FIG. 3 illustrates an operational diagram of HDD 100, with some elements of electronic circuits 130 and motor-driver chip 125 shown configured according to one embodiment. HDD 100 is connected to a host 10, such as a host computer, via a host interface 20, such as a serial advanced technology attachment (SATA) bus or a Serial Attached Small Computer System Interface (SAS) bus. As shown, microprocessor-based controller 133 includes one or more central processing units (CPU) 301 or other processors, a hard disk controller (HDC) 302, a DRAM 134, and read/write channels 137A and 137B, while motor-driver chip 125 includes a position control signal generating circuit 313 (e.g., Driver IC), a spindle motor (SPM) control circuit 314, a first actuator control circuit 315, and a second actuator control circuit 316. DRAM 134 may be integrated on the same die as the controller 133, included in a separate die in the same package as the controller 133, or included in a separate package mounted on circuit board 130. HDD 100 further includes preamplifiers 320A and 320B, which can be each mounted on actuator arm assemblies 120A and 120B or elsewhere within the head and disk assembly (HDA) of HDD 100. Preamplifier 320A supplies a write signal (e.g., current) to read/write head 127A-D in response to write data input from read/write channel 137A-D, and preamplifier 320B supplies a write signal (e.g., current) to read/write head 127E-H in response to write data input from read/write channel 137B. In addition, preamplifier 320A amplifies a read signal output from to read/write head 127A-D and transmits the amplified read signal to read/write channel 137A, and preamplifier 320B amplifies a read signal output from to read/write head 127E-H and transmits the amplified read signal to read/write channel 137B.

CPU 301 controls HDD 100, for example according to firmware stored in flash memory device 135 or another nonvolatile memory, such as portions of recording surfaces 112A-112H. For example, CPU 301 manages various processes performed by HDC 302, read/write channels 137A and 137B, read/write heads 127A-127H, recording surfaces 112A-112H, and/or motor-driver chip 125. Such processes include a command scheduling process (described in greater detail below) for disk access commands received from host 10, a writing process for writing data onto recording surfaces 112A-112H, and a reading process for reading data from recording surfaces 112A-112H. In some embodiments, the command scheduling process is implemented via a command scheduling algorithm 303 that can reside in whole or in part in RAM 134 and/or in firmware or an application-specific integrated circuit 301A included in CPU 301. A first command queue 334A and a second command queue 334B may also reside in RAM 134. First command queue 334A includes disk access commands to be executed by VCM 128A, first actuator control circuit 315, R/W channel 137A, and preamplifier 320A. Second command queue 334B includes disk access commands to be executed by VCM 128B, second actuator control circuit 316, RAY channel 137B, and preamplifier 320B.

In the embodiment illustrated in FIG. 3, microprocessor-based controller 133 includes a single CPU 301 incorporated into a single SoC 131. In alternative embodiments, microprocessor-based controller 133 includes more than one CPU. In such embodiments, HDD 100 can include two CPUs; one devoted to servo/spindle control and the other devoted to a combination of host-based and disk-control activities. Alternatively, in such embodiments, HDD 100 includes a separate SoC for each actuator, where each SoC has two such CPUs. Further, in some embodiments, HDD 100 includes multiple motor driver chips. For instance, in one such embodiment, a first motor driver chip is dedicated for controlling the spindle motor and a first actuator while a second motor driver chip is dedicated for controlling a second actuator.

Read/write channels 137A and 137B are signal processing circuits that encode write data input from HDC 302 and output the encoded write data to respective preamplifiers 320A and 320B. Read/write channels 137A and 137B also decode read signals transmitted from respective preamplifiers 320A and 320B into read data that are outputted to HDC 302. In some embodiments, read/write channels 137A and 137B each include a single read channel and a single write channel, whereas in other embodiments, read/write channels 137A and 137B each include multiple write channels and/or multiple read channels for read/write heads 127A-127H. HDC 302 controls access to DRAM 134 by CPU 301, read/write channels 137A and 137B, and host 10, and receives/transmits data from/to host 10 via interface 20. In some embodiments, the components of microprocessor-based controller 133 (e.g., CPU 301, HDC 302, DRAM 134, and read/write channels 137A, 137B) are implemented as a one-chip integrated circuit (i.e., as an SoC). Alternatively, one or more of CPU 301, HDC 302, DRAM 134, and read/write channels 137A and 137B can each be implemented as a separate chip.

Motor-driver chip 125 drives the spindle motor 114, a first actuator (that includes VCM 128A, actuator arms 124A-124C, and bearing assembly 126A), and a second actuator (that includes VCM 128B, actuator arms 124D-124F, and bearing assembly 126B). Specifically, SPM control circuit 314 generates a drive signal 341 (a drive voltage or a drive current) in response to a control signal 351 received from the CPU 301 and feedback from the spindle motor 114, and supplies drive signal 341 to spindle motor 114. In this way, spindle motor 114 rotates storage disks 110A-110D. In addition, first actuator control circuit 315 generates a drive signal 342 (drive voltage or drive current) in accordance with a received position control signal 352, and supplies drive signal 342 to the first actuator (VCM 128A). In this way, the first actuator positions read/write heads 127A-127D radially relative to a corresponding one of recording surfaces 112A-112D. Further, second actuator control circuit 316 generates a drive signal 343 in accordance with a received position control signal 353, and supplies the position control signal 343 to the second actuator (VCM 128B). In this way, the second actuator positions read/write heads 127E-127H radially with respect to a corresponding one of recording surface 112E-127H. Position control signal generating circuit 313 generates position control signals 352 and 353 in response to control signals 361 and 362 (which are control values for VCMs 128A and 128B) from CPU 301, respectively. Control signals 361 enable execution of disk access commands received from host 10 that are to be executed by a first servo system of HDD 100 and control signals 362 enable execution of disk access commands received from host 10 that are to be executed by a second servo system of HDD 100. CPU 301 generates position control signals 363 and 364, which are control values for microactuators 128 and/or microactuators 129, and transmits position control signals 363 and 364 to preamplifiers 320A and 320B.

The embodiment illustrated in FIG. 3 shows first servo controller 315 and second servo controller 316 implemented as parts of motor-driver chip 125. In other embodiments, first servo controller 315 and second servo controller 316 are implemented in whole or in part in firmware running on CPU 301. In embodiments in which microprocessor-based controller 133 includes multiple CPUs, such firmware can run on one or more of the multiple CPUs.

In an embodiment, the first servo system of HDD 100 (e.g., CPU 301, read/write channel 137A, preamplifier 320A, first actuator control circuit 315, and voice-coil motor 128A) performs positioning of a read/write head included in actuator arm assembly 120A (e.g., read/write head 127A) over a corresponding recording surface (e.g., recording surface 112A), during which CPU 301 determines an appropriate current to drive through the voice coil of VCM 128A. Typically, the appropriate current is determined based in part on a position feedback signal of the read/write head, i.e., a position error signal (PES) and on a target current profile. Similarly, the second servo system of HDD 100 (e.g., CPU 301, read/write channel 137B, preamplifier 320B, second actuator control circuit 316, and voice-coil motor 128B) performs positioning of a read/write head included in actuator arm assembly 120B (e.g., read/write head 127E) over a corresponding recording surface (e.g., recording surface 112E), during which CPU 301 determines an appropriate current to drive through the voice coil of VCM 128B. Although a single CPU 301 is shown here, it is possible that multiple CPUs might be used (for example, one or more CPUs for each actuator).

Seek Scheduling Based on Aggressor Operation Disturbance Times

As noted previously, when one actuator of a multiple-actuator HDD is seeking to a targeted data storage track, cross-actuator coupling can generate vibrations which will significantly affect the positioning accuracy of the other actuator. In particular, the high accelerations and changes in acceleration of the seeking actuator are likely to affect the positioning accuracy of the other actuator when the other actuator is attempting to closely follow a specific data track, for example during a read or write operation. The accelerations of an actuator during an exemplary seek operation are described below in conjunction with FIG. 4.

Figure 4:
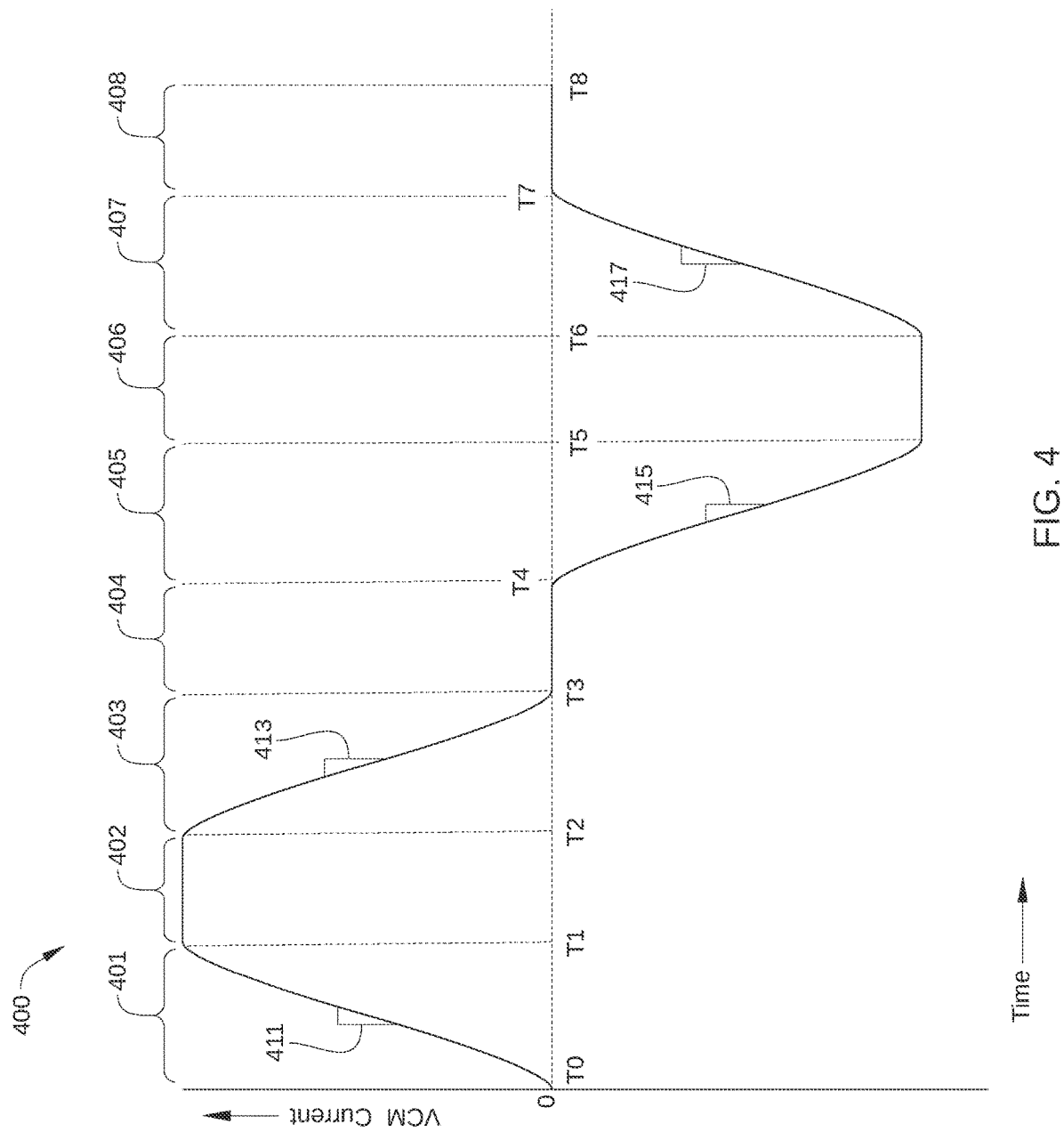
FIG. 4 illustrates a voice coil motor (VCM) drive current profile during an example seek operation.

FIG. 4 illustrates a VCM drive current profile 400 during an example seek operation. VCM drive current profile 400 indicates changes over time of current applied to a VCM, such as VCM 128A or VCM 128B of FIG. 1. Typically, the seek operation is executed as part of a read or write operation, which can be completed once a read/write head is precisely positioned over a targeted data storage track. During the seek operation, an actuator of HDD 100 (e.g., VCM 128A or 128B) radially repositions a read/write head from a current radial location over a recording surface to a target radial location over the recording surface, e.g. a targeted data storage track. The value of VCM current profile 400 at any time during the seek operation is roughly proportional to the radial acceleration of the actuator performing the seek at that time. Thus, during the course of the seek operation, the value of VCM drive current profile 400 increases, decreases, or remains constant, depending on what radial acceleration is being employed for seeking the read/write head to a target radial location.

The seek operation includes some or all of the following segments: an acceleration increase segment 401, a constant acceleration segment 402, an acceleration decrease segment 403, a coasting segment 404, a deceleration increase segment 405, a constant deceleration segment 406, a deceleration decrease segment 407, and a track following segment 408. As shown, VCM drive current profile 400 increases with time (between a time T0 and T1) at a rate that includes a maximum slope 411 during the initial acceleration increase segment 401, decreases with time (between a time T2 and T3) at a rate that includes a maximum slope 413 during the acceleration decrease segment 403, decreases with time (between a time T4 and T5) at a rate that includes a maximum slope 415 during the deceleration increase segment 405, and increases with time (between a time T6 and T7) at a rate that includes a maximum slope 417 during the deceleration decrease segment 407. During coasting segment 404, where little or no drive current is applied to the actuator, the radial velocity of the actuator remains substantially constant. Similarly, in track following segment 408, in which the actuator positions a head over a target track, only small drive current is applied to the actuator. In the embodiment illustrated in FIG. 4, certain segments (e.g., constant acceleration segment 402 and constant deceleration segment 406) are shown having substantially constant acceleration or deceleration over the entire interval. In some embodiments, the VCM current can change slightly during a particular segment (for example, due to limits of back electromotive force), while the current is substantially the same, or changing very slowly.

It is noted that a particular seek operation may not include all of the above-described segments. For example, in some instances, a seek operation can be of insufficient length to include coasting segment 404, constant acceleration segment 402, and/or constant deceleration segment 406.

Certain segments of the seek operation are likely to result in a significant mechanical disturbance of another actuator that is performing an operation in which precise positioning of a read/write head is necessary. Such segments are referred to herein as a disturbance time, and include segments of the seek operation in which a rate of change of acceleration, also referred to as "jerk," exceeds a threshold value. In FIG. 4, such a threshold value can be represented by a maximum absolute value of the slope of VCM drive current profile 400. Thus, when the absolute value of maximum slope 411 exceeds a predetermined threshold slope value, acceleration increase segment 401 can be considered a disturbance time of the seek operation. Similarly, when the absolute value of maximum slope 413 exceeds the predetermined threshold slope value, acceleration decrease segment 403 can be considered a disturbance time of the seek operation; when the absolute value of maximum slope 415 exceeds the predetermined threshold slope value, deceleration increase segment 405 can be considered a disturbance time of the seek operation; and when the absolute value of maximum slope 417 exceeds the predetermined threshold slope value, deceleration decrease segment 407 can be considered a disturbance time of the seek operation.

Additionally, in some embodiments, segments of a seek operation that include absolute values of acceleration or deceleration that exceed a threshold may also result in sufficient cross-actuator coupling to disturb another actuator in a critical time of an operation. In such embodiments, when the absolute value of VCM drive current profile 400 exceeds a predetermined threshold value, constant acceleration segment 402 and/or constant deceleration segment 406 can also be considered disturbance times for the seek operation.

Additionally, in some embodiments, a disturbance time for a seek operation can extend beyond a time of high slew-rate of the seek operation. Specifically, in some instances, transient vibrations caused by one segment of the seek operation of the actuator can affect the other actuator for a certain time interval after that segment. For example, in some embodiments, transient vibrations from the seek operation can extend into an initial portion of track following segment 408. Therefore, in such embodiments, a portion of track following segment 408 can also be considered a disturbance time of a seek operation. In another example, in such embodiments, transient vibrations from acceleration increase segment 401 can extend into constant acceleration segment 402, hence all or a portion of the latter segment can also be considered a disturbance time. Similarly, in such embodiments, transient vibrations from acceleration decrease segment 403 can extend into coasting segment 404, hence some or all of the latter segment can also be considered a disturbance time. Thus, a disturbance time may not only occur during a segment of the seek operation in which a high VCM slew-rate occurs (e.g., acceleration increase segment 401 or deceleration increase segment 405).

Figure 5:
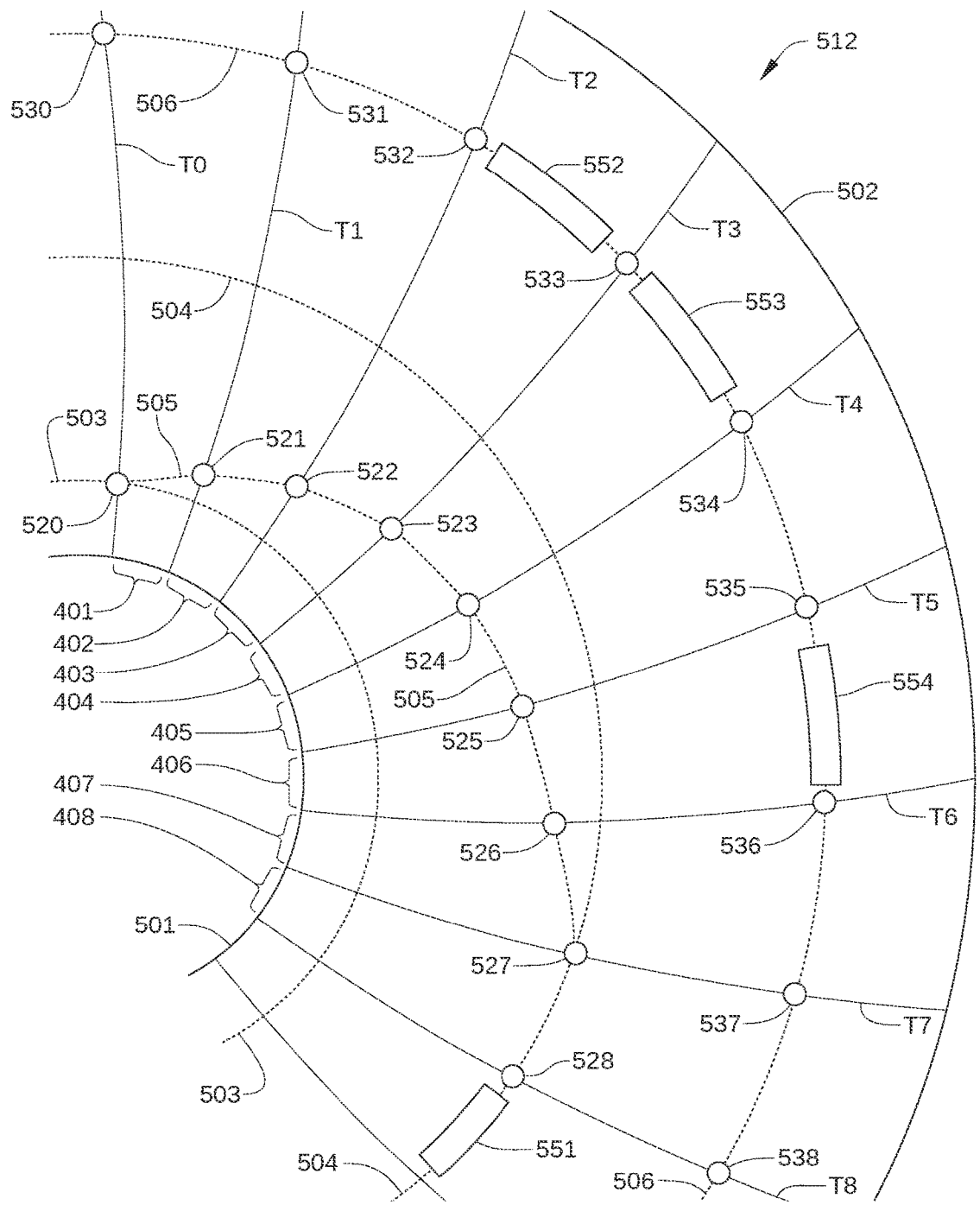
FIG. 5 schematically illustrates various positions of an aggressor head (not shown) relative to a recording surface during an aggressor seek operation, according to an embodiment.

FIG. 5 schematically illustrates various positions of an aggressor head (not shown) relative to a recording surface 512 during an aggressor seek operation, according to an embodiment. The aggressor head is a read/write head of HDD 100 that is positioned by an aggressor actuator (not shown) of HDD 100. For example, the aggressor head can be one of read/write heads 127A-127H in FIG. 2. The aggressor actuator is an actuator of HDD 100 (e.g., actuator arm assembly 120A and VCM 128A or actuator arm assembly 120B and VCM 128B) that is coupled to the aggressor head, and recording surface 512 is a recording surface of HDD 100 that corresponds to the aggressor head. For example, in an instance in which the aggressor head is read/write head 127A, the aggressor actuator is VCM 128A of FIG. 1 and recording surface 512 is recording surface 112A of FIG. 1. The victim head is a read/write head of HDD 100 that is positioned by a victim actuator of HDD 100. For example, when the aggressor head is one of read/write heads 127A-127D in FIG. 2, the victim head is one of read/write heads 127E-127H in FIG. 2 and the victim actuator is actuator arm assembly 120B and VCM 128B.

In the aggressor seek operation, the aggressor actuator begins performing the aggressor seek operation while a victim actuator is in the process of performing a victim disk access operation with the victim head (not shown). The victim actuator is considered in the process of performing a particular victim disk access operation when the victim actuator is performing a seek operation of the particular victim disk access operation or positioning a head over a target track of the particular victim disk access operation (i.e., track following). More broadly, the victim actuator may be considered in the process of performing a particular victim disk access operation when microprocessor-based controller 133 has designated the particular victim disk access operation to be the next disk access operation to be performed by the actuator.

Although the victim head does not interact directly with recording surface 512 of FIG. 5, for reference, various positions of the victim head are shown in FIG. 5 relative to recording surface 512 that correspond in time to various positions of the aggressor head relative to recording surface 512. In addition, in embodiments in which the aggressor actuator and the victim actuator rotate about a common point (such as shaft axis 226 in FIG. 2), the possible radial locations of the aggressor head and the victim head at a specific point in time can be indicated by a curve extending from an inner diameter (ID) 501 to an outer diameter (OD) 502 of recording surface 512. Thus, at time T0, the possible radial locations of the aggressor head and the victim head are delineated by a single radial curve, at time T1 by another radial curve, at time T2 by yet another radial curve, and so on.

In the embodiment illustrated in FIG. 5, in the aggressor seek operation, the aggressor actuator positions the aggressor head from an origin track 503 to a target track 504, for example for the execution of a read operation from or a write operation to sectors 551 of target track 504. Thus, the aggressor actuator moves the aggressor head via a seek path 505 that follows positions 521-528. As shown, seek path 505 includes acceleration increase segment 401, constant acceleration segment 402, acceleration decrease segment 403, coasting segment 404, deceleration increase segment 405, constant deceleration segment 406, deceleration decrease segment 407, and track following segment 408, which are delineated as shown by times T0-T8. By contrast, the victim head, which is already in the process of completing the victim disk access operation, has already been positioned on a target track 506 for execution of the victim disk access operation. For example, the victim disk access operation can include reading data from or writing data to one of sectors 552, 553, or 554. Thus, at times T0 to T8, the victim head is disposed over target track 506 at positions 530-538, respectively. It is noted that target track 506 and sectors 552-554 are disposed on a different recording surface than recording surface 512, but are depicted in FIG. 5 in corresponding locations on recording surface 512 for reference with respect to origin track 503, target track 504, sectors 551, and positions 521-528.

As illustrated in FIG. 5, in some instances a disturbance time of the aggressor seek operation coincides with at least a portion of a critical time of the victim disk access operation. For example, when one or more of acceleration increase segment 401, acceleration decrease segment 403, deceleration increase segment 405, and/or deceleration decrease segment 407 overlaps at least a portion of the time interval during which the victim head is track following to perform read or write operations for the victim disk access operation, the position of the victim head can be disturbed significantly. Thus, when the victim head is performing a read or write operation on sectors 552 of target track 506, the increased vibrations associated with acceleration decrease segment 403 can adversely affect the execution of the victim disk access operation. By contrast, when the victim head is performing a read write operation only on sectors 554 of target track 506, none of the possible disturbance times of the aggressor seek operation coincide with any of the critical time of the victim disk access operation, because the victim head is positioned over sectors 554 during constant deceleration segment 406 of the aggressor seek operation. Similarly, when the victim head is performing a read or write operation on sectors 553 of target track 506, none of the possible disturbance times of the aggressor seek operation coincide with any of the critical time of the victim disk access operation, since the victim head is positioned over sectors 553 during coasting segment 404 of the aggressor seek operation. According to various embodiments, an aggressor disk access command is selected for the aggressor actuator and modified so that no disturbance time of the aggressor disk access command coincides with a critical time of the victim disk access operation. One embodiment of modifying an aggressor disk access command is described below in conjunction with FIG. 6.

Figure 6:
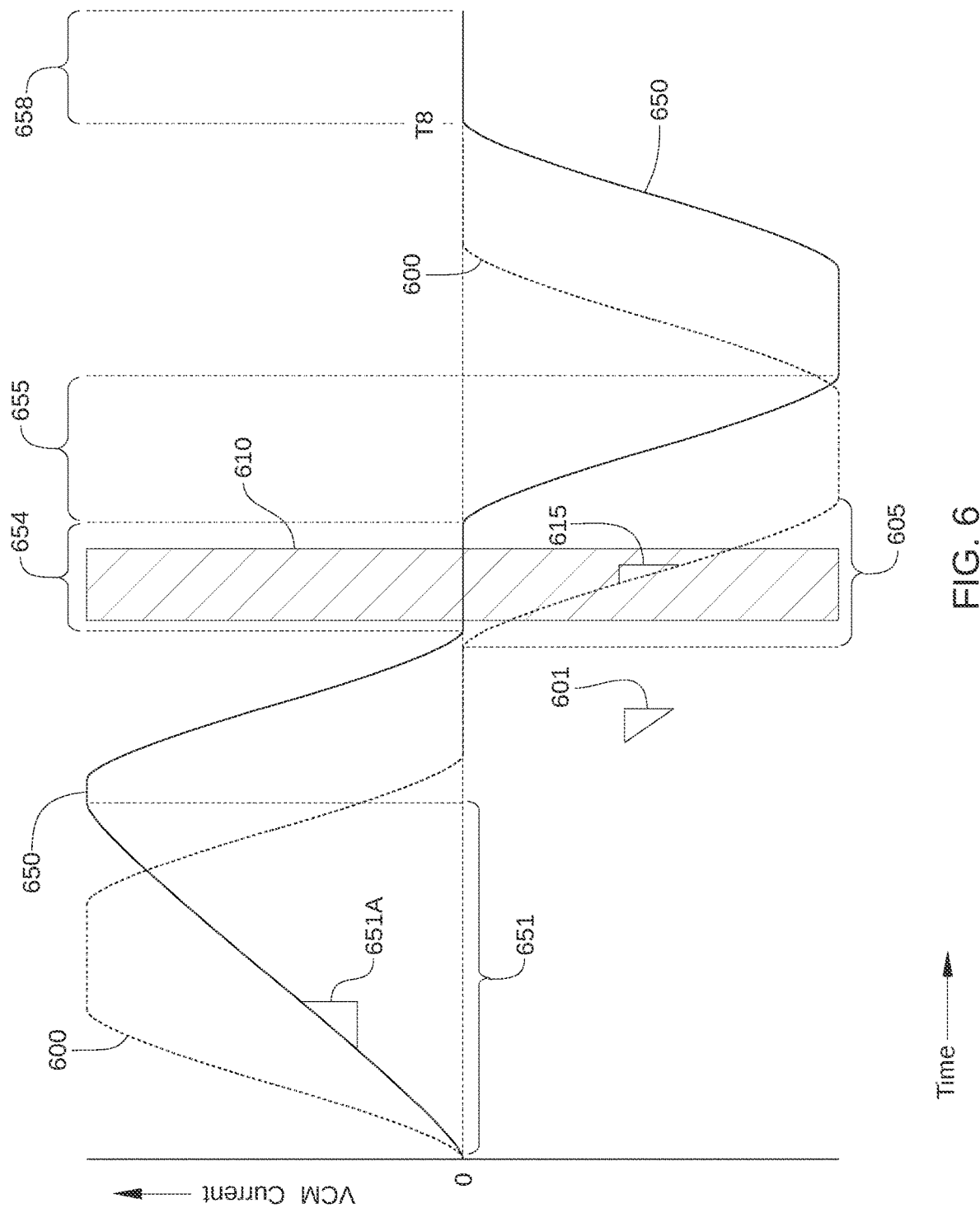
FIG. 6 illustrates changes over time of a VCM drive current profile during an aggressor seek operation and a VCM drive current profile during a modified aggressor seek operation, according to an embodiment.

FIG. 6 illustrates changes over time of a VCM drive current 600 profile (dashed line) during an aggressor seek operation and a VCM drive current 650 profile (solid line) during a modified aggressor seek operation, according to an embodiment. Also shown in FIG. 6 is a critical time 610 (cross-hatched), during which disturbances to a victim disk access operation are more likely to adversely affect the victim disk access operation. For example, critical time 610 can correspond to a time interval during which the victim head is positioned over target sectors of a target track and is executing a read or write operation.

In the modified the aggressor seek operation, one or more segments of the aggressor seek operation are modified so that no disturbance time of the aggressor disk access command coincides with critical time 610. As shown in FIG. 6, the unmodified aggressor seek operation includes a deceleration increase segment 605 that coincides with critical time 610. In deceleration increase segment 605, VCM drive current profile 600 has a maximum slope 615 that has an absolute value that exceeds a threshold slope value 601. Because threshold slope value 601 indicates a minimum value of actuator jerk at which the victim disk access operation is typically disturbed, deceleration increase segment 605 can be considered a disturbance time of the unmodified aggressor seek operation. By contrast, the modified aggressor seek operation includes a deceleration increase segment 655 that does not coincide with critical time 610. Instead, a coasting segment 654 of the modified aggressor seek operation coincides with critical time 610, and, as a result, no disturbance time of the modified aggressor seek operation coincides with critical time 610. In the embodiment illustrated in FIG. 6, an acceleration increase segment 651 included in VCM drive current 650 profile has a maximum slope 651A that has an absolute value that is equal to or less than threshold slope value 601. Due to the extended duration in time of acceleration increase segment 651 compared to an unmodified acceleration increase segment, deceleration increase segment 655 is delayed in time compared to deceleration increase segment 605 and, as a result, deceleration increase segment 655 does not coincide with critical time 610.

In addition, a time at which a track following segment 658 of the modified aggressor seek operation can begin is delayed from time T7 to time T8. That is, until time T8, the aggressor head performing the disk access operation is not positioned over a target track (e.g., target track 504 in FIG. 5) and the target sectors of the disk access operation.

Alternatively or additionally, in some embodiments a constant acceleration segment of an aggressor seek operation can be modified to delay the execution of a segment of the aggressor seek operation that is a disturbance time. As a result, during execution of a disk access operation that includes the modified aggressor seek operation, disturbance times of the modified aggressor seek operation do not correspond to a critical time of the victim disk access operation. One such embodiment is illustrated in FIG. 7.

Figure 7:
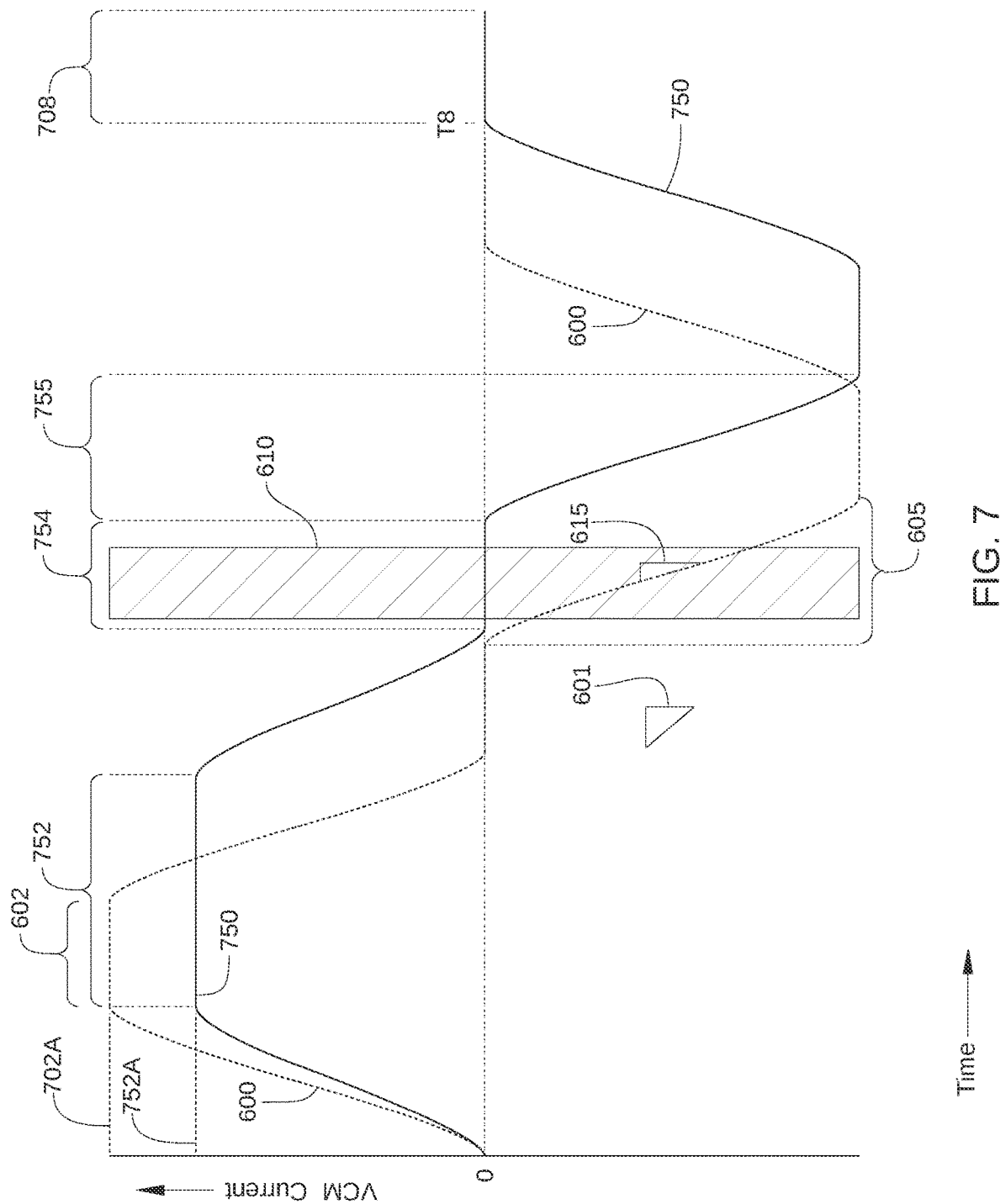
FIG. 7 illustrates changes over time of a VCM drive current profile during an unmodified aggressor seek operation and a VCM drive current profile during a modified aggressor seek operation, according to an embodiment.

FIG. 7 illustrates changes over time of VCM drive current 600 profile (dashed line) during an unmodified aggressor seek operation and a VCM drive current 750 profile (solid line) during a modified aggressor seek operation, according to an embodiment. Also shown in FIG. 7 is critical time 610, (cross-hatched) during which disturbances to a victim disk access operation are more likely to adversely affect the victim disk access operation. The unmodified aggressor seek operation includes deceleration increase segment 605 that coincides with critical time 610 and has maximum slope 615 with an absolute value that exceeds threshold slope value 601. Therefore, deceleration increase segment 605 can be considered a disturbance time of the unmodified aggressor seek operation. By contrast, the modified aggressor seek operation includes a deceleration increase segment 755 that does not coincide with critical time 610. Instead, a coasting segment 754 of the modified aggressor seek operation coincides with critical time 610, and, as a result, no disturbance time of the modified aggressor seek operation coincides with critical time 610.

In the modified the aggressor seek operation associated with VCM drive current profile 750, a constant acceleration segment 752 is modified relative to constant acceleration segment 602 of the unmodified aggressor seek operation. For example, in the embodiment illustrated in FIG. 7, constant acceleration segment 752 has a reduced maximum acceleration value 752A that is less than a maximum acceleration value 702A of constant acceleration segment 602 of the unmodified aggressor seek operation.

In the embodiment illustrated in FIG. 7, deceleration increase segment 755 of the modified aggressor seek operation occurs later than deceleration increase segment 605 of the unmodified aggressor seek operation, due to the reduced maximum acceleration value 752A of constant acceleration segment 752. In addition, a time at which a track following segment 708 of the modified aggressor seek operation can begin is delayed from time T7 to time T8. That is, until time T8, the aggressor head performing the disk access operation is not positioned over the target track of the aggressor seek operation and therefore is unable to execute a disk access operation associated with the unmodified aggressor seek operation.

Alternatively or additionally, in some embodiments a modified aggressor seek operation is generated in which a rate of change of acceleration (i.e., current) is modified for one or more segments of the aggressor seek operation, so that the one or more segments are not disturbance times of the modified aggressor seek operation. Thus, even though the one or more segments of the modified aggressor seek operation coincide with a critical time of a victim disk access operation, the victim disk access operation is not adversely affected by execution of the modified aggressor seek operation. One such embodiment is illustrated in FIG. 8.

Figure 8:
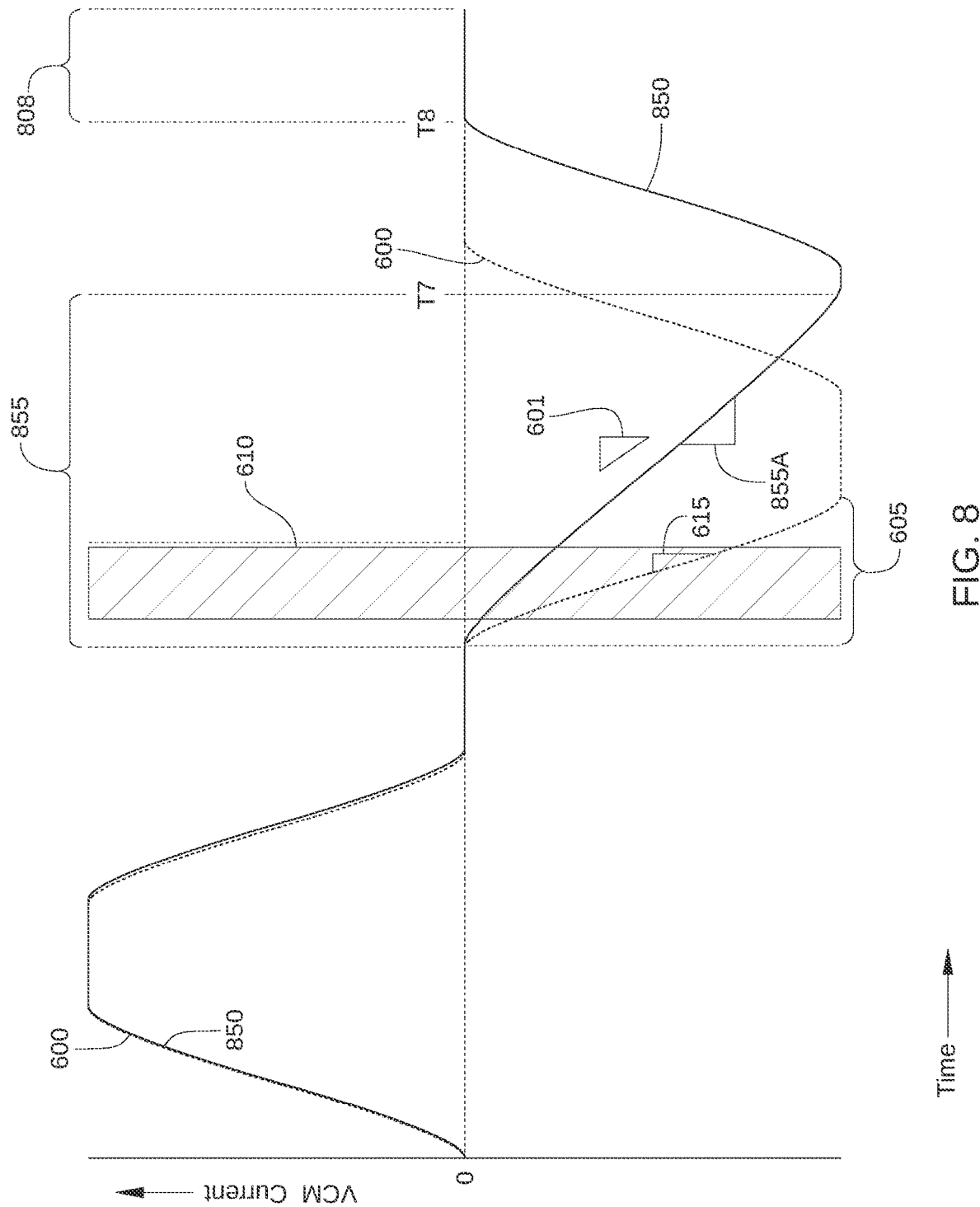
FIG. 8 illustrates changes over time of a VCM drive current profile during an unmodified aggressor seek operation and a VCM drive current profile during a modified aggressor seek operation, according to an embodiment.

FIG. 8 illustrates changes over time of VCM drive current 600 profile (dashed line) during an unmodified aggressor seek operation and a VCM drive current 850 profile (solid line) during a modified aggressor seek operation, according to an embodiment. Also shown in FIG. 8 is critical time 610, (cross-hatched) during which disturbances to a victim disk access operation are more likely to adversely affect the victim disk access operation, and deceleration increase segment 605. Deceleration increase segment 605 coincides with critical time 610 and can be considered a disturbance time of the unmodified aggressor seek operation, since during deceleration increase segment 605 VCM drive current 600 has a maximum slope 615 that has an absolute value that exceeds a threshold slope value 601. By contrast, the modified aggressor seek operation includes an acceleration decrease segment 853 that coincides with critical time 610, but cannot be considered a disturbance time of the unmodified aggressor seek operation. Specifically, in acceleration decrease segment 853, VCM drive current 850 has a maximum slope 853A that has an absolute value that is equal to or less than threshold slope value 601. As a result, no disturbance time of the modified aggressor seek operation coincides with critical time 610.

In the embodiment illustrated in FIG. 8, due to the reduced maximum slope 855A of VCM drive current 850 in acceleration decrease segment 855, a time at which a track following segment 808 of the modified aggressor seek operation can begin is delayed from time T7 to time T8. That is, until time T8, the aggressor head performing the disk access operation is not positioned over a target track and therefore is unable to execute a disk access operation associated with the unmodified aggressor seek operation.

Alternatively or additionally, in some embodiments a modified aggressor seek operation is generated in which a drive current (i.e., acceleration) is modified in multiple segments of the aggressor seek operation, so that none of the segments of the modified aggressor seek operation can be considered disturbance times. Thus, even though one or more segments of the modified aggressor seek operation coincide with a critical time of a victim disk access operation, the victim disk access operation is not adversely affected by execution of the modified aggressor seek operation. One such embodiment is illustrated in FIG. 9.

Figure 9:
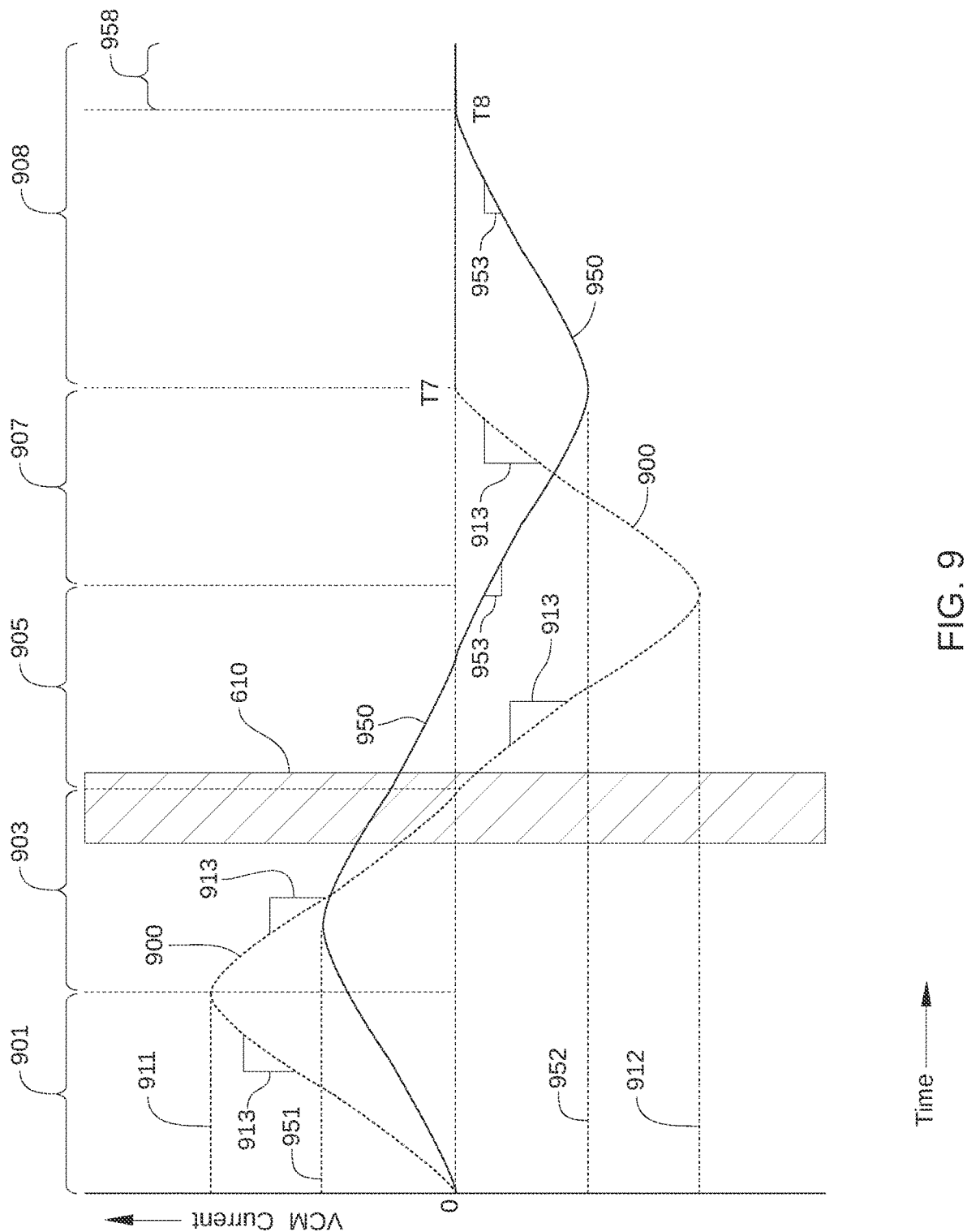
FIG. 9 illustrates changes over time of a VCM drive current profile during an unmodified aggressor seek operation and a VCM drive current profile during a modified aggressor seek operation, according to an embodiment.

FIG. 9 illustrates changes over time of a VCM drive current profile 900 (dashed line) during an unmodified aggressor seek operation and a VCM drive current 950 profile (solid line) during a modified aggressor seek operation, according to an embodiment. Also shown in FIG. 9 is critical time 610, (cross-hatched) during which disturbances to a victim disk access operation are more likely to adversely affect the victim disk access operation. In the embodiment illustrated in FIG. 9, VCM drive current profile 900 includes an acceleration increase segment 901, an acceleration decrease segment 903, a deceleration increase segment 905, a deceleration decrease segment 907, and a track following segment 908. Due to a maximum acceleration value 911, a maximum deceleration value 912, and/or slopes 913 of VCM drive current profile 900, some or all segments of VCM drive current profile 900 can potentially be considered disturbance times.

In some embodiments, VCM drive current profile 900 is employed in disk access operations in which relatively short seeks are performed. For example, in some embodiments, VCM drive current profile 900 is employed when a servo system of HDD 100 is performing a position mode seek rather than a velocity mode seek. Typically, in such embodiments, the seek is over a relatively short radial distance (e.g., on the order of about 15% of the stroke of the actuator or less), and VCM drive current profile 900 does not include a constant acceleration segment, a coasting segment, or a constant deceleration segment.

According to some embodiments, some or all segments of VCM drive current profile 950 are modified relative to VCM drive current profile 900 and employed in a modified aggressor seek operation. Specifically, as shown in FIG. 9, a maximum acceleration value 951 of VCM drive current profile 950 has a reduced value relative to maximum acceleration value 911, a maximum deceleration value 952 of VCM drive current profile 950 has a reduced value relative to maximum deceleration value 912, and/or slopes 953 of VCM drive current profile 950 have reduced values relative to slopes 913 of VCM drive current profile 900. As a result, none of the segments of the modified aggressor seek operation can be considered disturbance times.

In the embodiment illustrated in FIG. 9, due to the reduced values associated with maximum acceleration value 951, maximum deceleration value 952, and/or slopes 953, a time at which a track following segment 958 of the modified aggressor seek operation can begin is delayed from time T7 to time T8. That is, until time T8, the aggressor head performing the disk access operation is not positioned over a target track and therefore is unable to execute a disk access operation associated with the unmodified aggressor seek operation.

In some instances, a multi-actuator HDD receives and processes a stream of random read commands, i.e., read commands that are located at substantially random locations on the recording surfaces of the HDD. In such instances, the command queue for each actuator of the HDD includes a plurality of read commands that each typically reference a small number of sectors. Consequently, the critical time for each such command can be assumed to have a duration of no more than the time required for a read head to pass over a small portion of a particular data track, e.g., on the order of a few percent of the sectors of the data track. For instance, a small-block read command that is a single 4 KB sector in size generally corresponds to less than 1% of a track. Thus, in certain embodiments, a modified aggressor seek operation is generated in which a rate of change of acceleration and/or a maximum acceleration is modified for one or more segments of the aggressor seek operation. As a result, a portion of the modified aggressor seek operation that corresponds to a time required for the victim head to pass over a predetermined portion (for example 10%) of the target data track of the victim disk access operation is modified to not be considered a disturbance time.

For example, in one such embodiment, a modified aggressor seek operation is generated by modifying an acceleration increase segment (similar to acceleration increase segment 401 in FIG. 4), a constant acceleration segment (similar to constant acceleration segment 402 in FIG. 4), and an acceleration decrease segment (similar to an acceleration decrease segment 403 in FIG. 4) of an aggressor seek operation to take place over a time period that corresponds to the victim head passing over a predetermined portion (for example 10%) of the target data track of the victim disk access operation. In the embodiment, a rate of change of acceleration is decreased in the acceleration increase segment and the acceleration decrease segment, and a maximum acceleration is decreased in the constant acceleration segment. In some embodiments, the predetermined portion of the target track of the victim disk access operation can be as small as 1% of the target track. Alternatively, the predetermined portion of the target track can be as large as about 5-10% of the target track, to provide additional time for transient vibrations to die out that can affect the victim head.

As described above, in some situations a modified aggressor seek operation cannot be employed to execute a disk access operation due to a delay of the time at which a track following segment can begin (e.g., track following segment 658 in FIG. 6, track following segment 708 in FIG. 7, track following segment 808 in FIG. 8, or track following segment 958 in FIG. 9). In such situations, the aggressor head performing the disk access operation is not positioned over a target track in time to enable the disk access operation to be performed, i.e., before the target sectors of the disk access operation have already rotated past the aggressor head. According to some embodiments, a modified aggressor seek operation can still be employed to execute a disk access operation, but execution of the disk access operation is delayed by a complete revolution of the disk rather than by the delay caused by slowing maximum acceleration values and/or acceleration slopes. During the disk access execution delay, the recording surface on which the disk access operation is to be performed rotates for an additional complete revolution, until the target sectors of the disk access operation reach the aggressor head and the disk access operation can be performed. One such embodiment is illustrated in FIG. 10.

Figure 10:
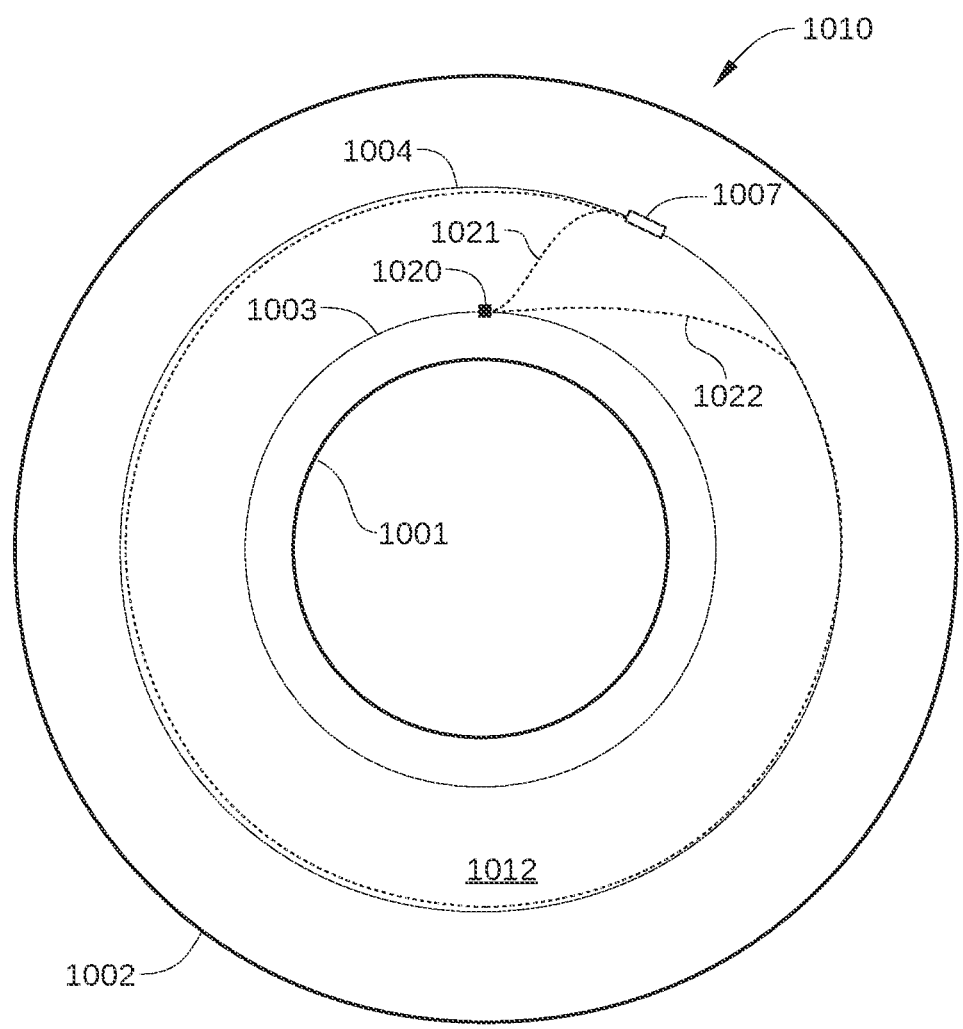
FIG. 10 schematically illustrates seek paths relative to a recording surface that are followed by an aggressor head during two different aggressor seek operations, according to an embodiment.

FIG. 10 schematically illustrates seek paths relative to a recording surface 1012 that are followed by an aggressor head 1020 during two different aggressor seek operations, according to an embodiment. Recording surface 1012 of storage disk 1010 has a plurality of concentric data storage tracks formed thereon between an ID 1001 and an OD 1002 of storage disk 1010, including an origin track 1003 and a target track 1004. In a disk access operation, aggressor head 1020 is moved from origin track 1003 to target track 1004 via an aggressor seek operation, then reads data from or writes data to a target sector 1007 on target track 1004. Thus, before executing an aggressor seek operation, head 1020 is disposed over origin track 1003, and after executing the aggressor seek operation head 1020 is disposed over target track 1004.

In a conventional aggressor seek operation, aggressor head 1020 is moved radially as quickly as practicable from origin track 1003 to target track 1004, for example along a conventional seek path 1021. As shown, by following conventional seek path 1021, aggressor head 1020 reaches target track 1004 before target sector 1007 is circumferentially co-located with aggressor head 1020. Therefore, the disk access operation can be performed with aggressor head 1020. By contrast, in a modified aggressor seek operation, aggressor head 1020 is moved radially over a longer time interval along a modified seek path 1022. As described above, the modified aggressor seek operation prevents a disturbance time of the seek operation from coinciding with a critical time of a victim disk access operation (not shown). However, by following modified seek path 1022, aggressor head 1020 is not positioned on target track 1004 before target sector 1007 is circumferentially co-located with aggressor head 1020. As a result, the disk access operation cannot be performed with aggressor head 1020 until storage disk 1010 has completed an additional rotation. Thus, when the modified aggressor seek operation is employed to access target sector 1007, a disk access execution delay occurs having a duration of one rotation of storage disk 1010. In such instances, during the disk access execution delay, aggressor head 1020 continues to track follow target track 1004 until target sector 1007 is again circumferentially co-located with aggressor head 1020. Thus, when the delay of the additional rotation takes place, the disk access time of the modified aggressor seek operation equals the disk access time of the original unmodified aggressor seek operation plus the additional revolution time delay.

In embodiments in which a disk access operation is modified with a one-revolution execution delay, such as that shown in FIG. 10, the time delay associated with completing the modified disk access operation is significant. In such embodiments, a different seek operation that is in a command queue for the aggressor actuator can, in many instances, be implemented more quickly than the disk access command modified with the one-revolution execution delay. As a result, in such instances, the different seek operation is selected to be the next aggressor operation, rather than the modified seek operation.

Figure 11:
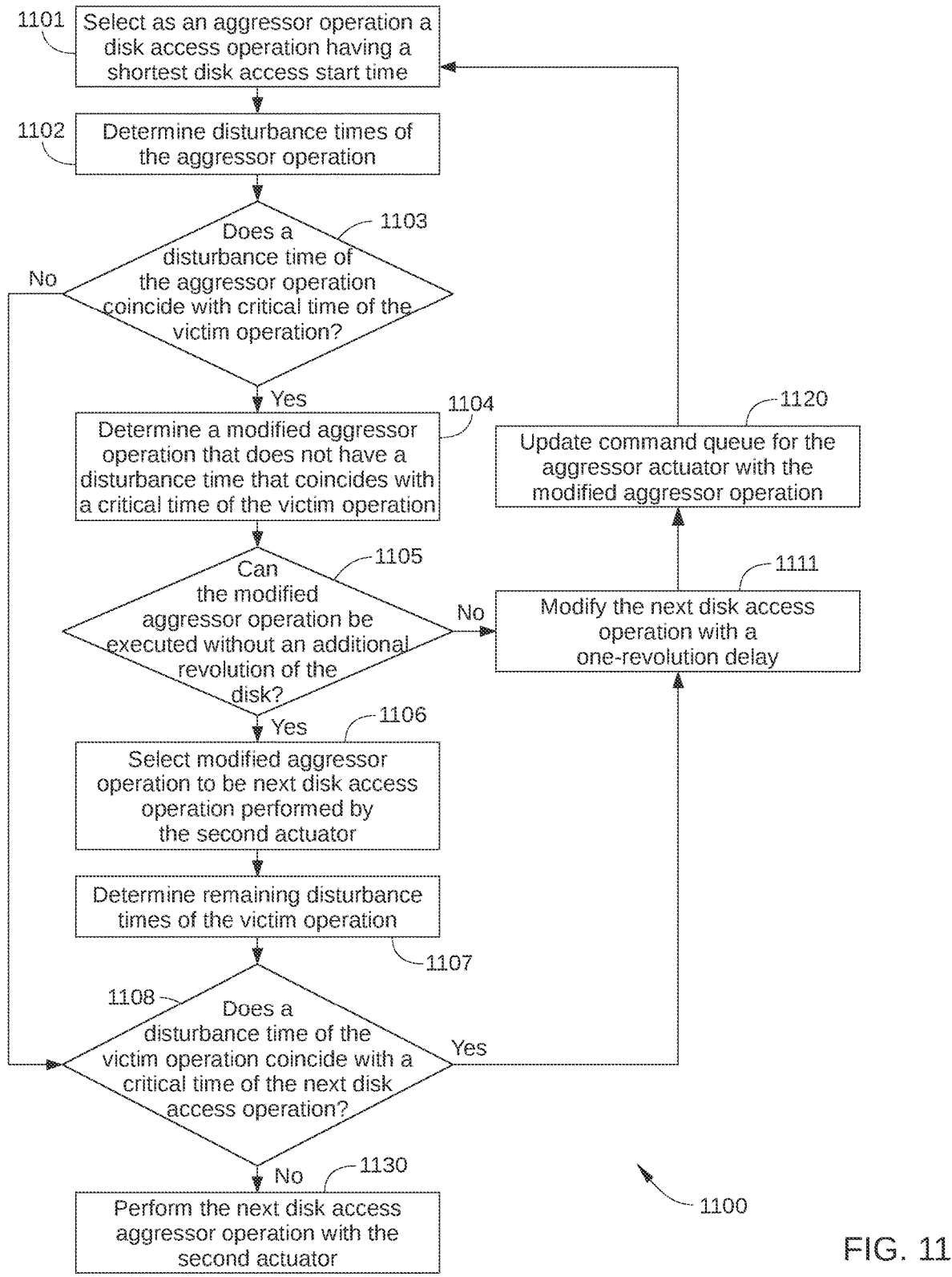
FIG. 11 sets forth a flowchart of method steps for selecting and executing disk access operations in a multiple-actuator disk drive, according to an embodiment.

FIG. 11 sets forth a flowchart of method steps for selecting and executing disk access operations in a multiple-actuator disk drive, according to an embodiment. More specifically, the method steps are for selecting and executing disk access operations for a first actuator in the multiple-actuator disk drive while a second actuator in the drive is in the process of performing a victim disk access operation. Although the method steps are described in conjunction with HDD 100 of FIGS. 1-10, persons skilled in the art will understand that the method steps may be performed with other types of systems. The control algorithms for the method steps reside in CPU 301 as command scheduling algorithm 303. Command scheduling algorithm 303 can be implemented in whole or in part as software- or firmware-implemented logic, and/or as hardware-implemented logic circuits.

Prior to the method steps, microprocessor-based controller 133 receives one or more disk access commands from host 10, such as read and write commands. Disk access commands to be executed by a first actuator (e.g., VCM 127A) are stored in first command queue 334A and disk access commands to be executed by a second actuator (e.g., VCM 128A) are stored in second command queue 334B. In addition, to facilitate faster execution of the disk access commands stored in first command queue 334A and second command queue 334B, microprocessor-based controller 133 determines a value for a disk access timing metric for each entry in first command queue 334A and second command queue 334B, as illustrated in FIG. 12.

Figure 12:
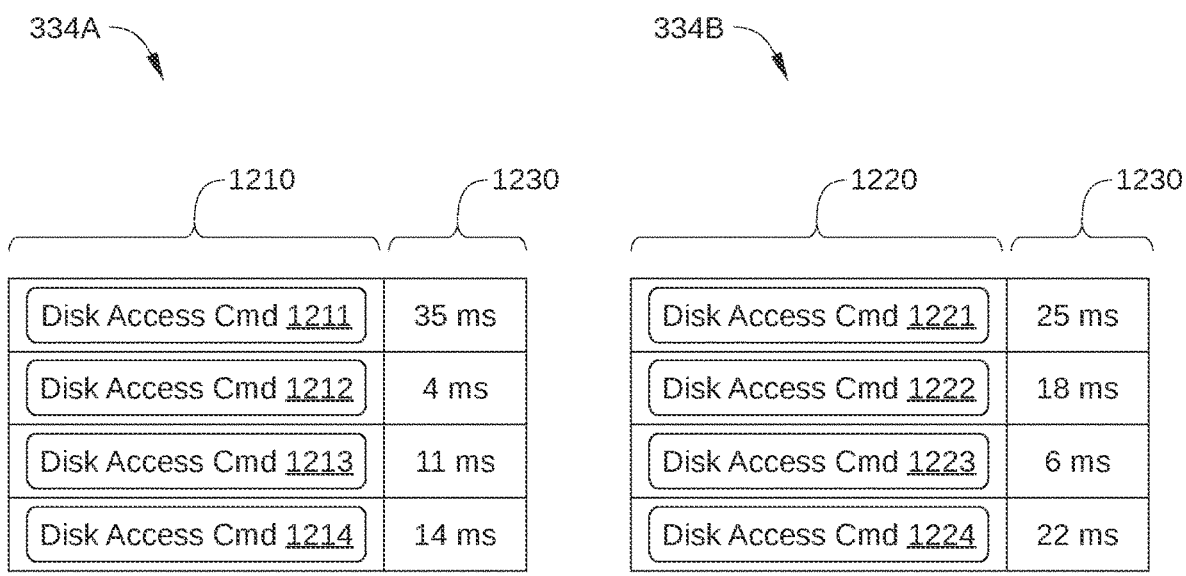
FIG. 12 schematically illustrates a first command queue and a second command queue, according to an embodiment.

FIG. 12 schematically illustrates first command queue 334A and second command queue 334B, according to an embodiment. As shown, first command queue 334A includes a plurality of disk access commands 1211-1214 (referred to collectively herein as disk access commands 1210) for execution by a first actuator of HDD 100 and a corresponding value for a disk access timing metric 1230. Similarly, second command queue 334B includes a plurality of disk access commands 1221-1224 (referred to collectively herein as disk access commands 1220) for execution by a second actuator of HDD 100 and a corresponding value for disk access timing metric 1230. In some embodiments, disk access commands 1210 and 1220 are exclusively read commands and, as such, typically have a higher priority to be completed than write commands. Alternatively, in some embodiments, disk access commands 1210 and/or 1220 can be exclusively write commands or can include a combination of read commands and write commands.

Disk access timing metric 1230 can be any metric for quantifying an execution time of at least a portion of an associated one of disk access commands 1210 or 1220. For example, in some embodiments, disk access timing metric 1230 for a particular disk access command can be based on an estimated seek time or an estimated time to begin disk access. In such embodiments, the estimated seek time can be an estimated duration of the time interval required for the actuator that executes the particular disk access command to move the appropriate head from a current track to a target track of the particular disk access command. In such embodiments, the required time interval can be based on one or more of multiple factors, including a seek distance (i.e., a radial distance, in tracks, between the current track to the target track) and whether a head switch is required for the actuator executing the particular disk access command.

In some embodiments, the estimated time to begin disk access for an actuator is based on one or more of an estimated circumferential position of a head of the actuator upon completion of a current disk access operation, an estimated circumferential position of the initial target sector of the disk access command, the estimated seek time, and a pre-access time interval for the disk access operation. The pre-access time interval includes a time interval that begins when the head is moved to the target track of the disk access command and ends when the head is positioned over the initial target sector of the disk access command and can begin execution of a disk access operation. Thus, in embodiments in which disk access timing metric 1230 is based on the seek distance and the pre-access time interval, the disk access timing metric 1230 for a particular disk access command is an estimate of when the appropriate head can begin actually accessing the disk as part of executing the disk access command.

Returning to FIG. 11, a method 1100 begins at step 1101, when microprocessor-based controller 133 selects a disk access command from a command queue for a first actuator of HDD 100, e.g., command queue 334A. Generally, in step 1101, a second actuator of HDD 100 (i.e., the victim actuator) is already in the process of performing a disk access command (i.e., the victim operation) from the other command queue, e.g., command queue 334B. Thus, the first actuator of HDD 100 is the aggressor actuator and the disk access command selected in step 1101 is a candidate aggressor operation.

Microprocessor-based controller 133 selects, as a candidate aggressor operation, the disk access command from disk access commands 1210 in command queue 334A, where the selection is based on the values of disk access timing metric 1230 in command queue 334A. Specifically, microprocessor-based controller 133 selects the disk access command having the smallest value for disk access timing metric 1230, which is the disk access command in command queue 334A that can begin to be executed the most quickly. Thus, in the embodiment illustrated in FIG. 12, microprocessor-based controller 133 selects disk access command 1212.

In step 1102, microprocessor-based controller 133 determines disturbance times for the candidate aggressor operation (selected in step 1101). In some embodiments, the disturbance times are determined based on a time at which the aggressor head has completed a current disk access operation and can begin seeking as part of the execution of the candidate aggressor operation. In some embodiments, the entire seek portion of the candidate aggressor operation is considered a disturbance time of the candidate aggressor operation. In other embodiments, segments of the candidate aggressor operation in which a drive current of the aggressor actuator increases or decreases at a rate that exceeds a threshold value are considered disturbance times of the candidate aggressor operation, such as when the absolute value of maximum slope of a VCM drive current profile exceeds a predetermined threshold slope value. In other embodiments, segments of the candidate aggressor operation in which an absolute value of the drive current of the aggressor actuator exceeds a threshold value are considered disturbance times of the candidate aggressor operation, such as when the absolute value of VCM drive current exceeds a predetermined maximum value. In other embodiments, transient vibrations caused by one segment of the seek operation of the actuator can affect the other actuator for a certain time interval after that segment. For example, an initial portion of a track following segment that follows the candidate aggressor operation can also be considered a disturbance time of the candidate aggressor operation.

In step 1103, microprocessor-based controller 133 determines whether a disturbance time of the candidate aggressor operation coincides with at least a portion of a critical time of the victim operation. If no, method 1100 proceeds to step 1108; if yes, method proceeds to step 1104.

In some embodiments, the critical time of the victim operation is also determined in step 1103. Alternatively, in some embodiments the critical time of the victim operation is determined prior to method 1100 and can be stored, for example, in an appropriate command queue. Alternatively, in some embodiments command scheduling algorithm 303 requests the critical time of the victim operation from the portion of control logic included in CPU 301 that controls the victim actuator.

In step 1104, microprocessor-based controller 133 determines a modified aggressor operation that does not have a disturbance time that coincides with the critical time of the victim operation. In some embodiments, the modified aggressor operation is generated by modifying one or more segments of the candidate aggressor operation so that a disturbance time of the modified aggressor operation is delayed and does not coincide with the critical time of the victim operation. In some embodiments, the modified aggressor operation is generated by modifying one or more segments of the candidate aggressor operation so that a rate of change in acceleration during the one or more segments is below a threshold value and is not considered a disturbance time of the modified aggressor operation. In some embodiments, the modified aggressor operation is generated by modifying one or more segments of the aggressor operation so that an absolute value of acceleration/deceleration during the one or more segments is below a threshold value and is not considered a disturbance time of the modified aggressor operation. In some embodiments, the modified aggressor operation is generated by delaying the start of the aggressor operation.

In step 1105, microprocessor-based controller 133 determines whether the modified aggressor operation generated in step 1104 can be executed without an additional rotation of the target recording surface. For example, in some embodiments, microprocessor-based controller 133 determines whether an execution start time of the modified aggressor operation occurs before the aggressor head passes over an initial sector of the target sectors of the aggressor operation. In such embodiments, the execution start time of the modified aggressor operation corresponds to the time at which data can begin to be read from or written to the target track when the aggressor head is positioned over the target track via the modified aggressor operation. Thus, when the aggressor head is circumferentially collocated with the initial sector of the target sectors before the modified aggressor operation positions the aggressor head over the target track, the modified aggressor operation generated in step 1104 cannot be executed without an additional rotation of the target recording surface. If yes, method 1100 proceeds to step 1106; if no, method 1100 proceeds to step 1111.

In step 1106, microprocessor-based controller 133 selects the modified aggressor operation to be the next disk access operation performed by the aggressor actuator.

In step 1107, microprocessor-based controller 133 determines remaining disturbance times of the victim operation. Disturbance times for the victim operation can be determined based on similar factors employed to determine disturbance times for the aggressor operation. For example, in some embodiments, any remaining portion of the seek portion of the victim operation can be considered a disturbance time of the victim operation. In other embodiments, remaining segments of the victim operation in which a drive current of the victim actuator increases or decreases at a rate that exceeds a threshold value are considered disturbance times of the victim operation. In other embodiments, remaining segments of the victim operation in which an absolute value of the drive current of the victim actuator exceeds a threshold value are considered disturbance times of the victim operation.

In step 1108, microprocessor-based controller 133 determines whether a disturbance time of the victim operation coincides with at least a portion of a critical time of the selected next disk access operation to be performed by the aggressor actuator. If no, method 1100 proceeds to step 1130; if yes, method 1100 proceeds to step 1111. In step 1108, the next disk access operation selected to be performed by the aggressor actuator is either the (unmodified) aggressor operation selected in step 1101 or the modified aggressor operation selected in step 1106.

In some embodiments, the critical time of the modified aggressor operation is also determined in step 1108. Alternatively, in some embodiments command scheduling algorithm 303 requests the critical time of the modified aggressor operation from the portion of control logic included in CPU 301 that controls the aggressor actuator.

Step 1111 is performed in response to (1) microprocessor-based controller 133 determining in step 1105 that the next disk access operation cannot be executed without additional rotation of the target recording surface or (2) microprocessor-based controller 133 determining in step 1108 that a disturbance time of the victim operation coincides with a critical time of the next disk access operation. In step 1111, microprocessor-based controller 133 modifies the modified aggressor operation (from step 1104) or the next disk access command (from step 1108) with a one-revolution delay. Thus, the modified aggressor operation (from step 1104) or the next disk access operation (from step 1108) is modified to have a delayed execution time that is equal to the execution of the original (unmodified) aggressor operation selected in step 1101 with a one-revolution delay added thereto. In the case of the modified aggressor operation from step 1104, the delayed execution time of the modified aggressor operation corresponds to a time at which the aggressor head can first begin reading data from or writing data to the target sectors of the aggressor operation when the aggressor head is positioned over the target track via the modified aggressor operation. In the case of the next disk access operation from step 1108, the delayed execution time of the next disk access operation prevents the next disk access operation from being disturbed by the victim operation.

Step 1120 is performed in response to microprocessor-based controller 133 determining in step 1108 that a disturbance time of the victim operation coincides with a critical time of the selected next aggressor disk operation or in response to microprocessor-based controller 133 determining in step 1105 that the modified aggressor operation cannot be executed without an additional revolution of the disk. In either case, a different next aggressor disk operation may need to be selected from the command queue for the aggressor actuator. As a result, in step 1120, microprocessor-based controller 133 updates the command queue for the aggressor actuator with an aggressor operation that includes an disk access timing metric 1230 based on the additional one-revolution delay.

In one instance, the command queue for the aggressor actuator is updated with the modified aggressor operation determined in step 1104, where the modified aggressor operation has an updated value for the disk access timing metric 1230 for that modified aggressor operation that includes the one-revolution execution delay. In addition, the original aggressor operation is removed for further use in method 1100 from the command queue for the aggressor actuator in method 1100. In another instance, the command queue for the aggressor actuator is updated with the next disk access operation of step 1108, where the modified aggressor operation has an updated value for the disk access timing metric 1230 for that aggressor operation that includes the one-revolution execution delay. In addition, the original aggressor operation is removed for further use in method 1100 from the command queue the aggressor actuator for further use in method 1100. Generally, the aggressor operations that are added to the aggressor command queue in step 1120 are relatively slow to execute, but in some instances such aggressor commands can still be the fastest to execute compared to the other available aggressor commands in the command queue for the aggressor actuator.

In step 1130, microprocessor-based controller 133 performs the aggressor operation with the aggressor actuator. Because the disturbance times of the aggressor operation are either modified or do not coincide with a critical time of the victim operation, execution of the aggressor operation does not significantly impact the victim operation during the critical time. In addition, in some embodiments, in step 1130, for each aggressor command and modified aggressor command included in the command queue for the aggressor actuator, the disk access timing metric 1230 for that aggressor operation is reset to an original value. Alternatively, each value for the disk access timing metric 1230 for each aggressor operation in the command queue for the aggressor actuator is recalculated based on the current aggressor and victim actuator commands.

In some embodiments, when a disturbance time of a victim operation is determined to coincide with a critical time of a modified aggressor operation, the victim operation can be modified. For example, in step 1108 of method 1100, microprocessor-based controller 133 may make such a determination. In response, microprocessor-based controller 133 can modify one or more disturbance times of the victim operation, so that none of the disturbance times of the victim operation coincide with a critical time of the modified aggressor operation. One such embodiment is illustrated in FIG. 13.

Figure 13:
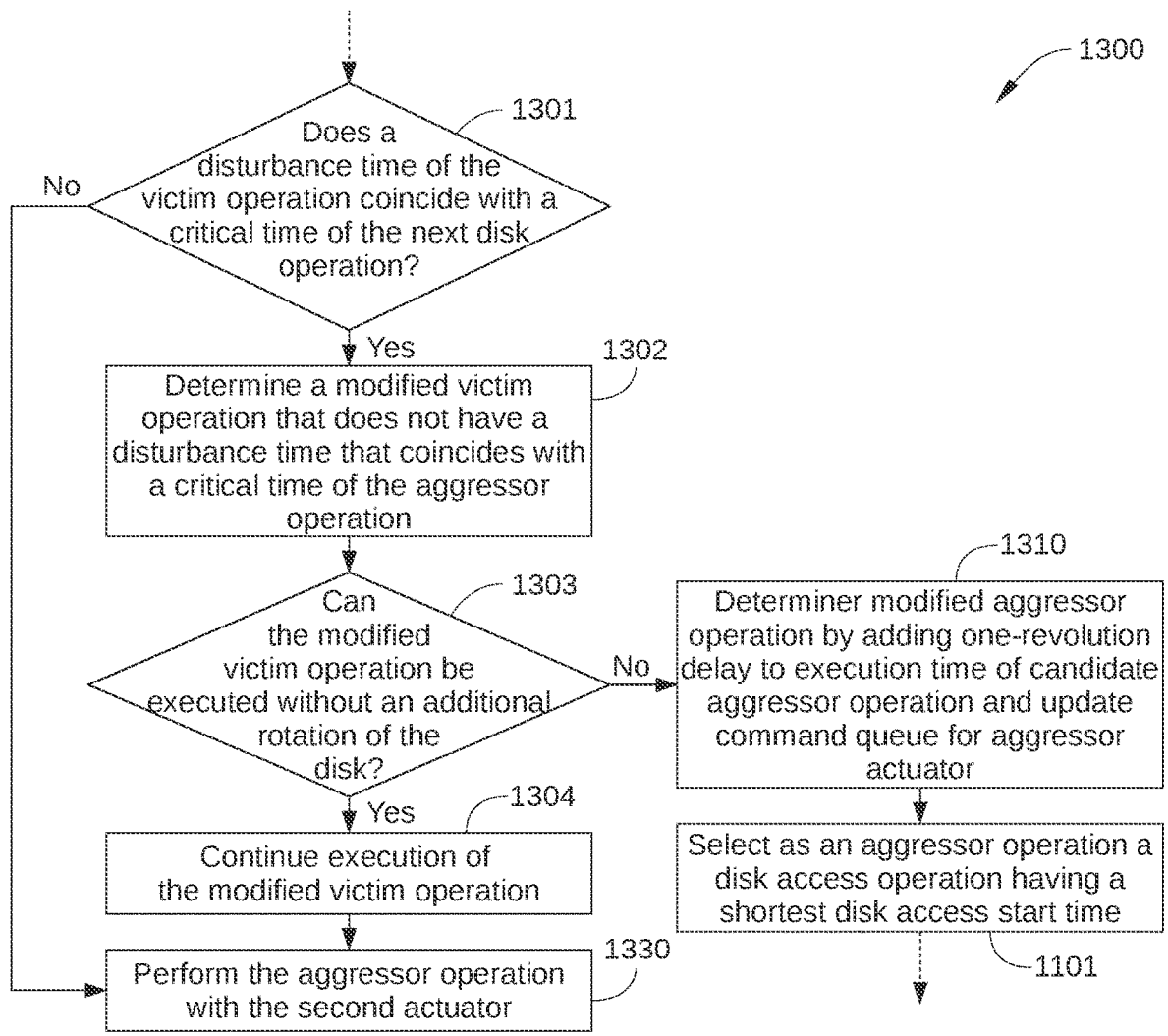
FIG. 13 sets forth a flowchart of method steps for selecting and executing disk access operations in a multiple-actuator disk drive, according to an embodiment.

FIG. 13 sets forth a flowchart of method steps for selecting and executing disk access operations in a multiple-actuator disk drive, according to an embodiment. More specifically, the method steps are for selecting and executing disk access operations for a first actuator in the multiple-actuator disk drive while a second actuator in the drive is in the process of performing a victim disk access operation. Although the method steps are described in conjunction with HDD 100 in FIGS. 1-12, persons skilled in the art will understand that the method steps may be performed with other types of systems. The control algorithms for the method steps reside in CPU 301 as command scheduling algorithm 303. Command scheduling algorithm 303 can be implemented in whole or in part as software- or firmware-implemented logic, and/or as hardware-implemented logic circuits.

Method 1300 begins at step 1301, which replaces step 1108 in method 1100. Thus, in step 1301, microprocessor-based controller 133 determines whether a disturbance time of the currently on-going victim operation coincides with at least a portion of a critical time of the selected next disk access operation to be performed by the aggressor actuator. If no, method 1300 proceeds to step 1330 and terminates; if yes, method 1300 proceeds to step 1302.

In some embodiments, the critical time of the modified aggressor operation is also determined in step 1301. Alternatively, in some embodiments command scheduling algorithm 303 requests the critical time of the aggressor operation from the portion of control logic included in CPU 301 that controls the aggressor actuator.

In step 1302, microprocessor-based controller 133 determines a modified victim operation that does not have a disturbance time that coincides with a critical time of the current candidate aggressor operation. In some embodiments, the modified victim operation is generated by modifying one or more segments of the victim operation in any of the ways described above in step 1104 for modifying the aggressor operation.

In step 1303, microprocessor-based controller 133 determines whether the modified victim operation generated in step 1104 can be executed without additional rotation of the target recording surface. For example, in some embodiments, microprocessor-based controller 133 determines whether an execution start time of the modified victim operation occurs before the victim head passes over an initial sector of the target sectors of the currently on-going victim operation. In such embodiments, the execution start time of the modified victim operation corresponds to the time at which data can begin to be read from or written to the target track when the victim head is positioned over the target track via the modified victim operation. Thus, when the victim head is circumferentially collocated with the initial sector of the target sectors of the victim operation before the modified victim operation positions the victim head over the target track, the modified victim operation determined in step 1302 cannot be executed without additional rotation of the target recording surface. If yes, method 1300 proceeds to step 1304; if no, method 1300 proceeds to step 1310.

In step 1304, microprocessor-based controller 133 continues execution of the modified victim operation. Because any remaining disturbance times of the currently on-going victim operation are either modified or do not coincide with a critical time of the modified aggressor operation, execution of the victim operation does not significantly impact the modified aggressor operation during a critical time.

Step 1310 is performed in response to the determination that the modified victim operation cannot be executed without an additional rotation of the target recording surface. In step 1310, a modified aggressor operation is determined by adding a delayed execution time to the candidate aggressor operation. Microprocessor-based controller 133 then updates the command queue for the aggressor actuator with the modified aggressor operation and an updated value for the disk access timing metric 1230 for the modified aggressor operation. Method 1300 then returns back to step 1101 of method 1100 (see FIG. 11), and a different one of disk access commands 1210 may be selected as a new candidate aggressor operation. Thus, if the victim operation cannot be modified to avoid disturbance of the current candidate modified aggressor operation, the candidate modified aggressor operation is replaced in the command queue for the aggressor actuator with a modified version of the candidate modified aggressor operation that now includes a one-revolution delay. The selection process for another candidate aggressor operation is then repeated to determine the next candidate aggressor operation.

In step 1330, which is substantially similar to step 1130 in method 1130, microprocessor-based controller 133 performs the modified aggressor operation with the aggressor actuator.

Seek Scheduling Based on Execution Start Times

In some embodiments, disk access commands for the two or more actuators of a multi-actuator HDD are selected simultaneously. The two or more disk access commands are then executed together, so that the multiple actuators seek to a respective target track at substantially the same time. Thus, the high accelerations and changes in acceleration that occur during the seeking of one actuator do not occur while one or more other actuators are track following and are most easily disturbed.

In some embodiments, a first disk access command is selected from a queue of commands for the first actuator and a second disk access command is selected from a queue of commands for the second actuator, where the selection of the first and second disk access commands is based on an approximate matching of a value of a first disk access timing metric for each command. For example, in one such embodiment, each of the disk access commands included in the command queue for the first actuator are matched with a corresponding disk access command in the command queue for the second actuator based on values of the first disk access timing metric, thereby generating a plurality of matched pairs of disk access commands. One particular matched pair of disk access commands is then selected based on a second disk access timing metric. The disk access commands included in the selected pair are the next disk access commands to be executed by the first and second actuators.

The first disk access timing metric is a measure of a time interval that transpires before a particular disk access command can begin to be executed or of a radial distance (e.g., measured in data tracks) of a seek that takes place as part of executing the particular disk access command. In some embodiments, the first disk access timing metric for an actuator is based on a predicted seek start position (over a recording surface) of a head of the actuator upon completion of the current disk access operation being executed by the actuator. For example, the seek start position of the head may correspond to a circumferential position of the head when passing over the last sector of a disk access command currently being executed by the actuator. Thus, in embodiments in which the first disk access timing metric is a measure of a time interval that transpires before a disk access command in the command queue for the actuator can begin to be executed, the time interval begins when the head reaches the circumferential position. In embodiments in which the first disk access timing metric is a measure of a radial distance of the seek that takes place as part of executing the particular disk access command, the seek distance is measured from the current data track over which a head of the actuator is positioned to a target data track of the particular disk access command.

The first disk access timing metric can include or be based on any of the factors on which disk access timing metric 1230 of FIG. 12 is based. For example, the first disk access can be based on an estimated seek time, a seek distance, whether a head switch is required for the actuator executing the particular disk access command, a predicted seek start position, an estimated circumferential position of the initial target sector of the disk access command, a pre-access time interval for the disk access operation, and/or an estimated time to begin disk access. Similarly, the second disk access timing metric is a measure of a time interval before a particular disk access command can be executed or of a radial extent of the seek that takes place as part of executing the particular disk access command. Thus, the second disk access timing metric can include or be based on any of the factors on which the first disk access timing metric is based, as described above.

In some embodiments, the first disk access timing metric and the second disk access timing metric can be the same measurement. For example, for a particular disk access command, the first disk access timing metric and the second disk access timing metric can each be a seek distance from a current radial position of a head of an actuator to a radial position of a target track of the particular disk access command. Alternatively, in some embodiments, for a particular disk access command, the first disk access timing metric is one measurement associated with disk access timing of the particular disk access command (e.g., seek distance) and the second disk access timing metric is a different measurement associated with disk access timing of the particular disk access command (e.g., an estimated time to begin disk access). For example, in one such embodiment, first disk access timing metric 1550 is based on a seek length, and is measured in data tracks, and second disk access timing metric 1560 is based on an estimated time to begin disk access. Implementation of one such embodiment is illustrated in FIG. 14.

Figure 14:
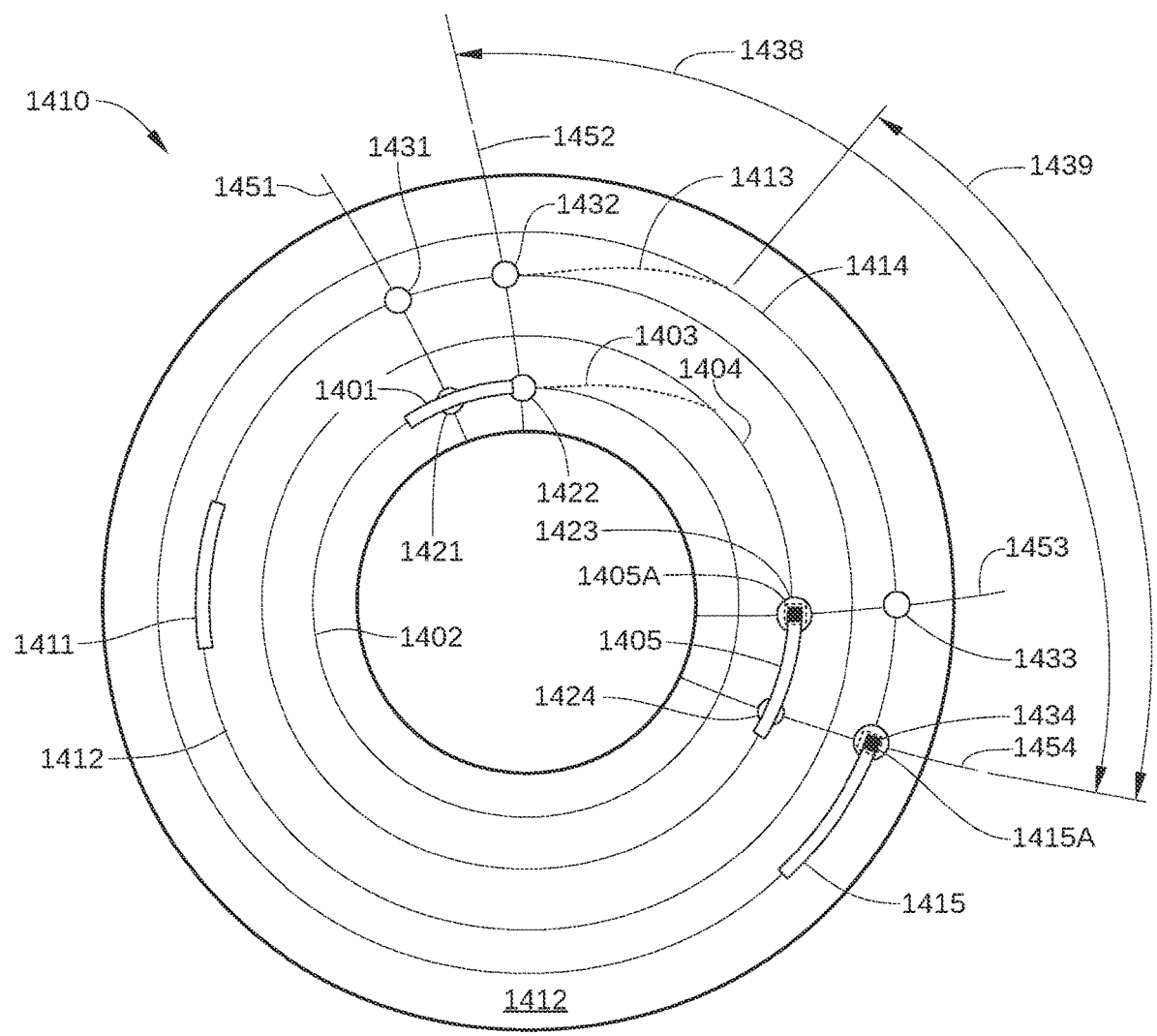
FIG. 14 schematically illustrates seek paths relative to a recording surface that are followed by a first head and a second head during seek operations that are selected based on a one or more disk access timing metrics, according to an embodiment.

FIG. 14 schematically illustrates seek paths relative to a recording surface 1412 that are followed by a first head and a second head (not shown) during seek operations that are selected based on a one or more disk access timing metrics, according to an embodiment. The first head is a read/write head that is positioned by a first actuator of an HDD over a recording surface 1412 of a storage disk 1410, and the second head is a read/write head that is positioned by a second actuator of the HDD over a different recording surface (not shown). For reference, the positions of the second head and tracks and sectors associated with the second head are shown relative to recording surface 1412.

At a time 1451, the first head is positioned at a location 1421, which is over target sectors 1401 of an origin track 1402. Consequently, at time 1451, the first head is performing a disk access operation of a current disk access command, such as reading data from or writing data to target sectors 1401. By contrast, at time 1451, the second head is positioned at a location 1431, which is over an origin track 1412, but is not over target sectors 1411 of origin track 1412. That is, at time 1451, the second head is track following over origin track 1412 after completing a disk operation associated with target sectors 1411, such as reading data from or writing data to target sectors 1411.

At a time 1452, the first head is positioned at a location 1422, which is over origin track 1402 but no longer over target sectors 1401 of origin track 1402. Consequently, at time 1452, the first head has completed performing the disk access operation of the current disk access command, and can begin execution of the next selected disk access command. In addition, at time 1452, the second head is positioned at a location 1432, which is still over origin track 1412. Thus, at time 1452, the second head has continued to track follow over origin track 1412 after completing the disk operation associated with target sectors 1411.

Because the first head has completed the current disk access command, at time 1452 the first head and the second head can begin execution of the next disk access command selected for each. Therefore, starting at time 1452, the first head is moved by a first actuator along a first seek path 1403 to a target track 1404 that includes target sectors 1405, and the second head is moved by a second actuator along a second seek path 1413 to a target track 1414 that includes target sectors 1415. As a result, the first head performs the seek portion of a first disk access command at substantially the same time that the second head performs the seek portion of a second disk access command.

At time 1453, the first head is positioned at a location 1423, which is over an initial target sector 1405A of target sectors 1405. Thus, when the first head is positioned at location 1423, the first head can begin execution of a disk access operation (e.g., reading or writing) associated with the current disk access command being implemented with the first actuator. Generally, execution of the disk access operation is a critical time of the disk access command being implemented with the first actuator. By contrast, at time 1453 the second head is positioned at a location 1433 and has not yet reached an initial target sector 1415A of target sectors 1415. Thus, at time 1453, the second head continues to track follow over target track 1414, which is not a disturbance time. Therefore, in most instances, the disturbance times of the second disk access command do not coincide with a critical time of the first disk access command, e.g., time 1453.

At time 1454, the first head is positioned at a location 1424 over target sectors 1405 and continues to execute the disk access operation associated with the first disk access command. The second head is positioned at a location 1434 over initial target sector 1415A of target sectors 1415 and begins execution of the disk access operation associated with the second disk access command. The first disk access command is not performing a seek operation at time 1454, and therefore the disturbance times of the first disk access command do not coincide with a critical time (i.e., time 1454) of the second disk access command.

Also shown in FIG. 14 are examples of factors on which a disk access timing metric is based, including a predicted seek length, an estimated circumferential position of the initial target sector of the disk access command, a pre-access time interval for the disk access operation, a proposed access time, and/or an estimated time to begin disk access. Because the first head is no longer over target sectors 1401 when positioned at location 1422, location 1422 is an example of a predicted seek start position for the next disk access command to be executed by the first actuator, while location 1432 is an example of a predicted seek start position for the next disk access command to be executed by the second actuator. In addition, location 1423 is an example of an estimated circumferential position of the initial target sector of the first disk access command, which is selected to be the next disk access command executed by the first actuator, and location 1434 is an example of an estimated circumferential position of the initial target sector of the second disk access command, which is selected to be the next disk access command executed by the second actuator. Further, a time interval 1439 is an example of a pre-access time interval for the second disk access operation. As shown, the pre-access time interval begins when the second head is positioned over target track 1414 of the second disk access command and ends when the second head is positioned over initial target sector 1415A of the second disk access command and can therefore begin execution of the second disk access operation. Additionally, a first and second head proposed access time 1438 is an example of a time interval that begins when both the first head and the second head can begin seeking (i.e., time 1452 in FIG. 14) and ends when the first head has reached the initial target sector of the first disk access command and the second head has reached the initial target sector of the second disk access command (i.e., time 1454 in FIG. 14). Thus, first and second head proposed access time 1438 is the time interval between when the last of either the first head and the second head finishes the previous disk operation until the last of either the first head and the second head has started a proposed new disk operation. For the first actuator, an estimated time to begin disk access is illustrated by time 1453, at which the first head is disposed over initial target sector 1405A of the first disk access command. For the second actuator, an estimated time to begin disk access is illustrated by time 1454, at which the second head is disposed over initial target sector 1415A of the second disk access command.

According to various embodiments, the first disk access command is selected from a first command queue for the first actuator based on a value of a first disk access timing metric for each disk access command in the first command queue. Similarly, the second disk access command is selected from a second command queue for the second actuator based on a value of the first disk access timing metric for each disk access command in the second command queue. More specifically, the first disk access command and the second disk access command are matched based on their respective values of the first disk access timing metric. In addition, based on a second disk access timing metric, the matched pair of the first disk access command and the second disk access command is selected from other matched pairs of disk access commands from the first command queue and the second command queue. Thus, a next disk access command to be executed by the first actuator and a next disk access command to be executed by the second actuator are selected simultaneously from the first command queue and the second command queue as a pair of matched commands. An embodiment in which the first disk access command and the second disk access command are simultaneously selected is described below in conjunction with FIGS. 15A-15E.

Figure 15A:
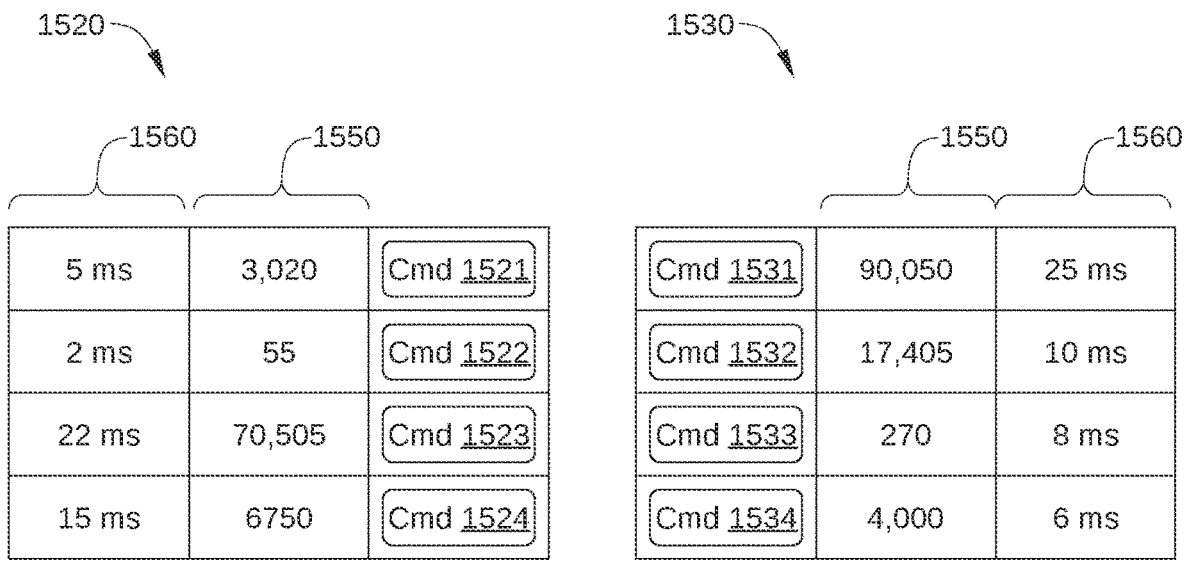
FIGS. 15A-15E illustrate a first command queue and a second command queue at various points in a command selection process, according to an embodiment.
Figure 15B:
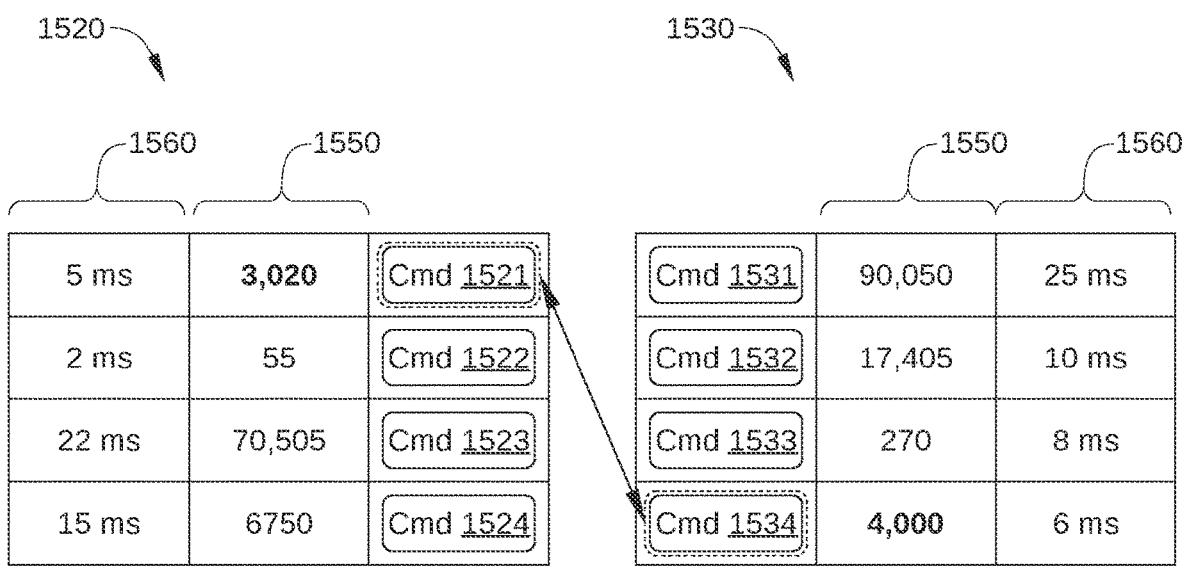

FIGS. 15A-15E illustrate a first command queue 1520 and a second command queue 1530 at various points in a command selection process, according to an embodiment. First command queue 1520 includes a plurality of disk access commands 1521-1524 to be executed by a first actuator of a multi-actuator HDD, and second command queue 1530 includes a plurality of disk access commands 1531-1534 to be executed by a second actuator of the multi-actuator HDD. Disk access commands 1521-1524 and disk access commands 1531-1534 can be all read commands, write commands, or a combination of both. In addition, first command queue 1520 and second command queue 1530 each include a value for a first disk access timing metric 1550 and, in some embodiments, a second disk access timing metric 1560. Disk access commands 1521-1524 each reference one or more sectors of a target track or tracks disposed on one or more recording surfaces that each correspond to a respective head of the first actuator, and disk access commands 1531-1534 each reference one or more sectors of a target track or tracks disposed on one or more recording surfaces that each correspond to a respective head of the second actuator. In FIG. 15A, disk access commands 1521 are listed in first command queue 1520 in order of receipt from host 10, and disk access commands 1531-1534 are listed in second command queue 1530 in order of receipt from host 10.

First disk access timing metric 1550 can include or be based on any of the factors on which disk access timing metric 1230 of FIG. 12 is based, such as an estimated seek time, a seek distance, whether a head switch is required for the actuator executing the particular disk access command, an estimated circumferential position of the head upon completion of a current disk access operation, an estimated circumferential position of the initial target sector of the disk access command, a first and second head proposed access time and a pre-access time interval for the disk access operation. Thus, in various embodiments, disk access timing metric 1550 can be measured in units of time, distance, or number of tracks. Second disk access timing metric 1560 can be a similar timing metric to first disk access timing metric 1550 or a different disk access timing metric, for example, a disk access timing metric based on different factors than first disk access timing metric 1550.

In some embodiments, the values of first disk access timing metric 1550 for each of disk access commands 1521-1524 is measured starting from a predicted seek start position. The predicted seek start position corresponds to the earliest execution time at which the last actuator to become available to perform a next disk access command is actually available to perform the next disk access command. In other words, the predicted seek start position corresponds to the earliest execution time at which the first actuator is available to perform a disk access command from the first queue and the second actuator is also available to perform a disk access command from the second queue. For example, in the instance illustrated in FIG. 14, the last actuator to become available to perform the next disk access command is the first actuator. Thus, the earliest execution time on which first disk access timing metric 1550 is based is time 1452, when the first head is no longer disposed over target sectors 1401 and the first actuator is available to perform another disk access command from first command queue 1520. Similarly, in such embodiments, the values of second disk access timing metric 1560 for each of disk access commands 1531-1534 is measured from time 1452, which is the same earliest execution time as that on which first disk access timing metric 1550 is based. Thus, according to the embodiments, the second actuator has the same earliest execution time as the first actuator, and is available to perform a disk access command from second command queue 1530 at the same time that first actuator is available to perform a disk access command from first command queue 1520.

In the command selection process, a next disk access command to be executed by the first actuator and a next disk access command to be executed by the second actuator are selected, typically while a current disk access command is being executed by the first actuator and a current disk access command is being executed by the second actuator. In the command selection process, the next disk access command for the first actuator and the next disk access command for the second actuator are selected based on a value of first disk access timing metric 1550 for each of disk access commands 1521-1524 and disk access commands 1531-1534. In this way, each of some or all of disk access commands 1521-1524 is uniquely matched to a corresponding one of disk access commands 1531-1534.

In the command selection process, the first disk access command from first command queue 1520 (e.g., disk access command 1521) is selected and matched with a remaining disk access command from second command queue 1530, where the remaining disk access command from second command queue 1530 has a value of first disk access timing metric 1550 that is closer than any other disk access command in second command queue 1530 to the value of first disk access timing metric 1550 for the selected disk access command. Thus, in FIG. 15B, disk access command 1521 has a value of 3,020 tracks, and is matched with disk access command 1534, since disk access command 1534 has a value (4,000 tracks) of first disk access timing metric 1550 that is closer than any other disk access command in second command queue 1530 to 3,020 tracks.

Figure 15C:
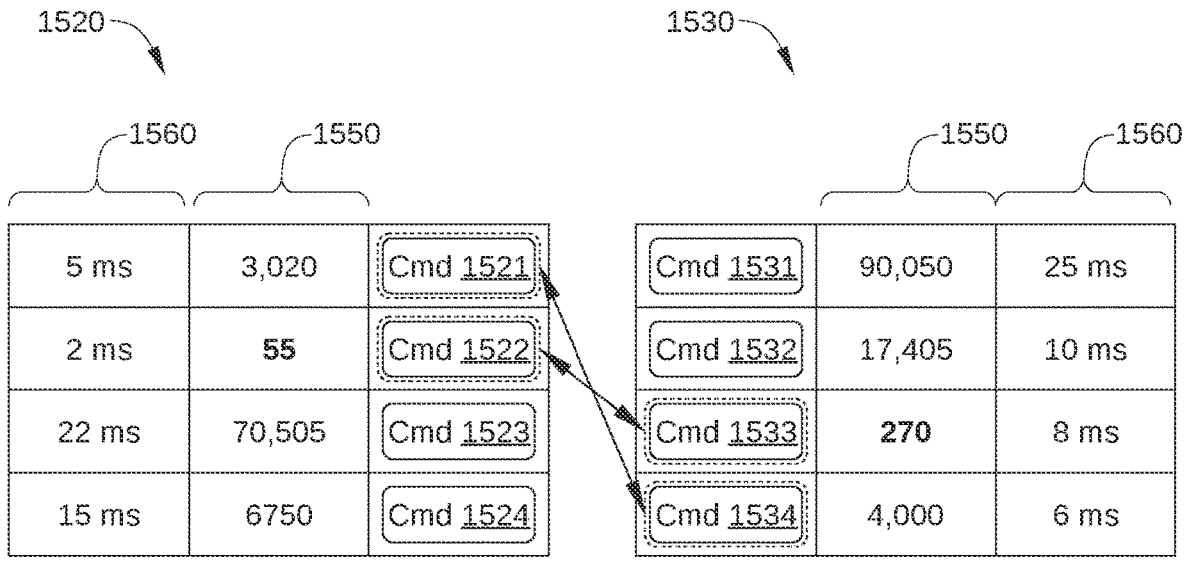
Figure 15D:
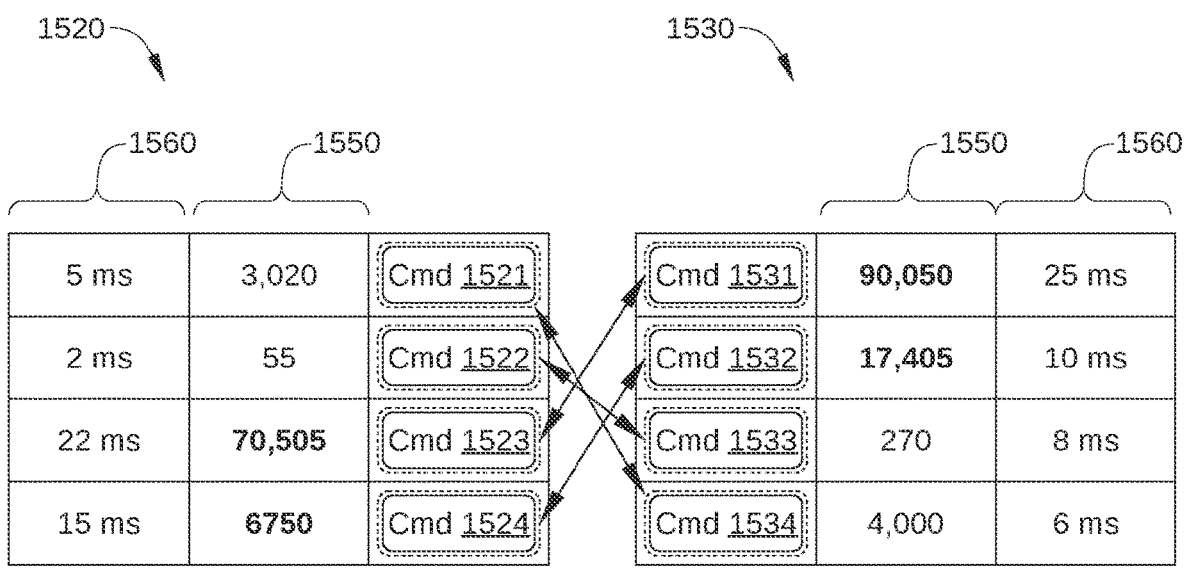

Then, as shown in FIG. 15C, the second disk access command from first command queue 1520 (e.g., disk access command 1522) is selected and matched with a remaining disk access command from second command queue 1530, where the remaining disk access command from second command queue 1530 has a value of first disk access timing metric 1550 that is closer than any other disk access command in second command queue 1530 to the value of first disk access timing metric 1550 for the selected disk access command (e.g., 55 tracks for disk access command 1522). Thus, in FIG. 15C, disk access command 1522 is matched with disk access command 1533, since disk access command 1533 has a value (270 tracks) of first disk access timing metric 1550 that is closer to 55 tracks than any other remaining disk access command in second command queue 1530. In FIG. 15D, disk access command 1523 is matched to disk access command 1531 in second command queue 1530 and disk access command 1524 is matched to disk access command 1532 in second command queue 1530 using a similar procedure. In this way, a plurality of pairs of matched disk access commands is generated.

The order in which disk access commands from first command queue 1520 are selected for matching with a disk access command from second command queue 1530 can be according to any suitable criterion. For example, in some embodiments, disk access commands from first command queue 1520 are selected for matching in order of receipt from host 10. Thus, in such embodiments, the oldest remaining disk access command from first command queue 1520 is selected for matching. In other embodiments, disk access commands from first command queue 1520 are selected for matching based on a value of first disk access timing metric 1550 for each disk access command or of second disk access timing metric 1560 for each disk access command.

Once some or all of disk access commands 1521-1524 are matched to a corresponding disk access command from second command queue 1530 and a plurality of pairs of matched disk access commands has been generated, one pair of matched disk access commands is selected to be the disk access commands next executed by the first actuator and the second actuator. In some embodiments, the selection of the pair of matched disk access commands to be the disk access commands next executed is based on values of second disk access timing metric 1560 for each disk access command.

In some embodiments, second disk access timing metric 1560 corresponds to or is based on a time interval, such as an estimated seek time or an estimated time to begin disk access. In such embodiments, the selection of the pair of matched disk access commands to be the disk access commands next executed is based on a greatest value (i.e., the longest time interval) of second disk access timing metric 1560 for each pair of matched disk access commands. One such embodiment is illustrated in FIG. 15E.

Figure 15E:
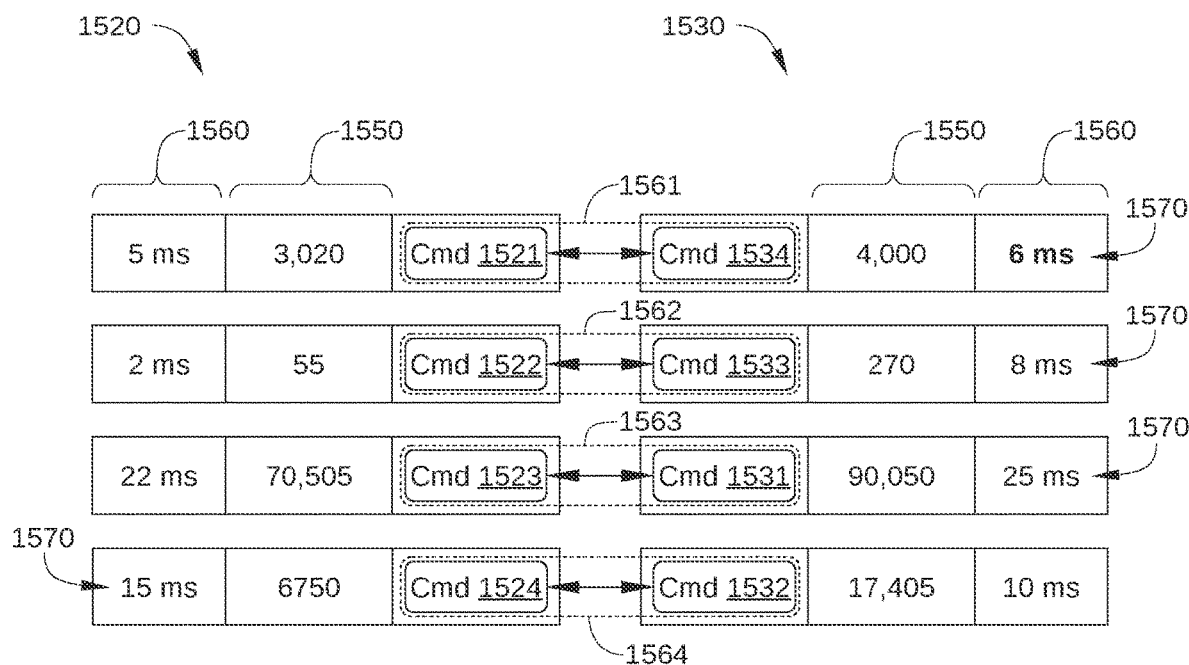

FIG. 15E depicts first command queue 1520 and second command queue 1530 with disk access commands 1521-1524 and 1531-1534 arranged in the matched pairs, according to an embodiment. As shown, disk access command 1521 is matched with disk access command 1534 as a first matched pair 1561 of disk access commands, disk access command 1522 is matched with disk access command 1533 as a second matched pair 1562 of disk access commands, disk access command 1523 is matched with disk access command 1531 as a third matched pair 1563 of disk access commands, and disk access command 1524 is matched with disk access command 1532 as a fourth matched pair 1564 of disk access commands.

Each of matched pairs 1561-1564 has a greatest value 1570 of second disk access timing metric 1560. Thus, in the embodiment illustrated in FIG. 15E, greatest value 1570 of second disk access timing metric 1560 for matched pair 1561 is 6 ms, because the value of second disk access timing metric 1560 for disk access command 1534 is 6 ms, which is greater than 5 ms (the value of second disk access timing metric 1560 for disk access command 1521). Similarly, greatest value 1570 for matched pair 1562 is 8 ms, because the value of second disk access timing metric 1560 for disk access command 1534 (8 ms) is greater than the value of second disk access timing metric 1560 for disk access command 1522 (2 ms). Further, greatest value 1570 for matched pair 1563 is 25 ms and greatest value 1570 for matched pair 1564 is 15 ms.

As noted above, in some embodiments of the command selection process, one pair from matched pairs 1561-1564 is selected based on the greatest value 1570 for each pair of matched disk access commands. Thus, in embodiments in which second disk access timing metric 1560 corresponds to or is based on a time interval, the selection of a pair from matched pairs 1561-1564 is based on a longest time interval associated with each of matched pairs 1561-1564, such as a longest estimated seek time of each matched pair or a longest estimated time to begin disk access of each matched pair. In the selection process, the pair from matched pairs 1561-1564 is selected based on a smallest value of greatest value 1570. That is, the matched pair having the smallest value for greatest value 1570 is selected. In the embodiment illustrated in FIG. 15E, matched pair 1561 is selected, since greatest value 1570 for matched pair 1561 is less than greatest value 1570 for any other available matched pair associated with first command queue 1520 and second command queue 1530.

In some embodiments, selection of a pair from matched pairs 1561-1564 based on the smallest value for greatest value 1570 corresponds to selecting the matched pair of disk access commands in which both the first actuator and the second actuator have each positioned a head over a target track at an earlier time than any other matched pair of disk access commands. Consequently, the selection of such a matched pair of disk access commands facilitates low-latency execution of the disk access commands included in first command queue 1520 and second command queue 1530.

Upon selection of one matched pair of disk access commands from matched pairs 1561-1564, the commands included in the matched pair are then implemented as the next disk access commands to be executed by the first actuator and the second actuator. For example, in the embodiment illustrated in FIG. 15E, the first actuator executes disk access command 1521 and the second actuator executes disk access command 1534 via a procedure similar to that illustrated in FIG. 14. That is, the first actuator begins executing disk access command 1521 when an appropriate head of the first actuator is at a predicted seek start position (e.g., location 1422), and, substantially simultaneously, the second actuator executes disk access command 1534, since an appropriate head of the second actuator is also at a predicted seek start position (e.g., location 1432).

In the embodiment illustrated in FIGS. 15A-15E, matched pairs 1561-1564 are generated based on values of first disk access timing metric 1550 and the selection of a particular one of matched pairs 1561-1564 is based on a greatest value 1570 of second disk access timing metric 1560. In alternative embodiments, only a single disk access timing metric is employed. That is, in such embodiments, the same disk access timing metric is employed for generating matched pairs 1561-1564 and for selecting a particular one of matched pairs 1561-1564 based on a greatest value 1570.

Figure 16:
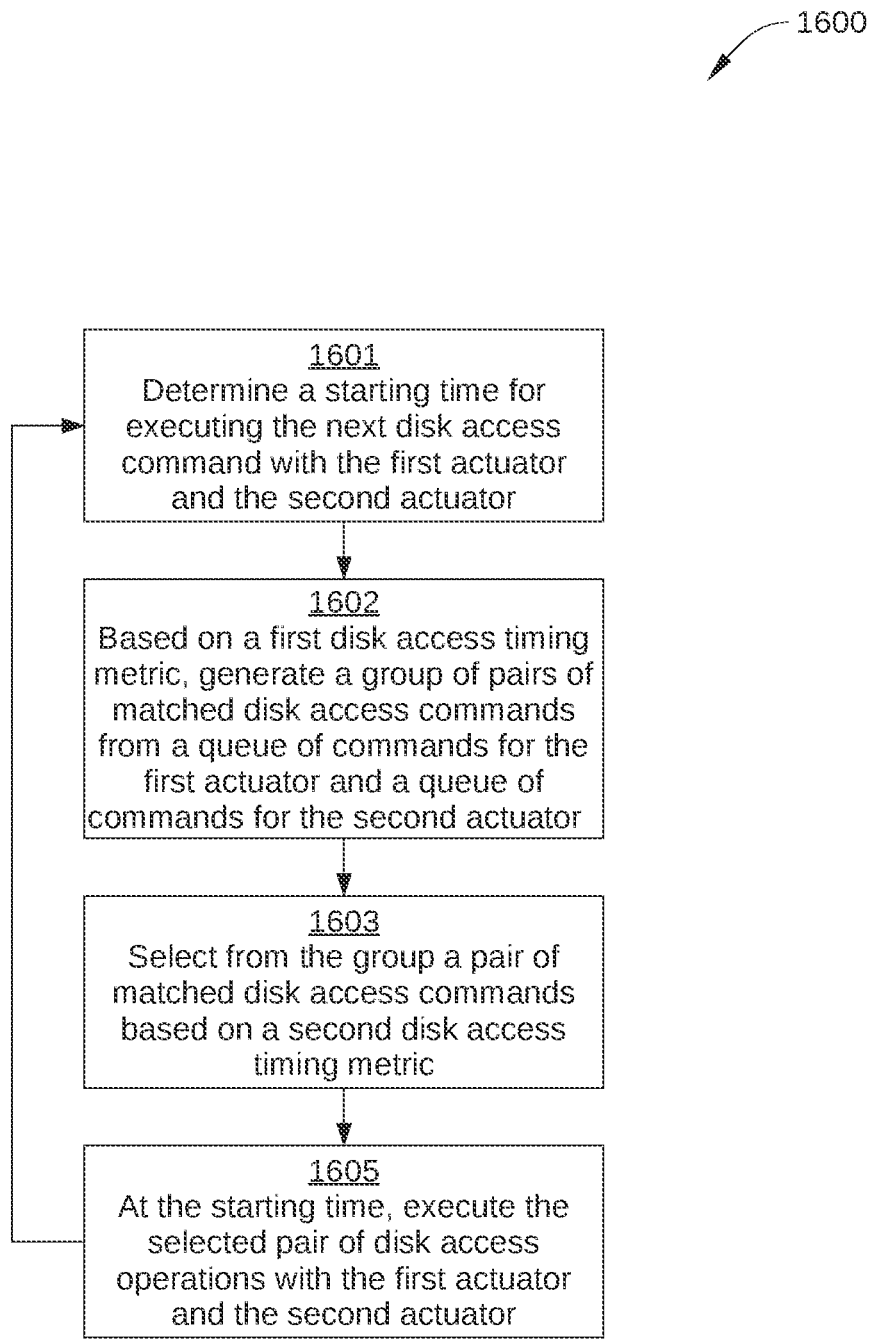
FIG. 16 sets forth a flowchart of method steps for selecting and executing disk access operations in a disk drive that includes a first actuator having a first head and a second actuator having a second head, according to an embodiment.

FIG. 16 sets forth a flowchart of method steps for selecting and executing disk access operations in a disk drive that includes a first actuator having a first head and a second actuator having a second head, according to an embodiment. Although the method steps are described in conjunction with HDD 100 in FIGS. 1-15, persons skilled in the art will understand that the method steps may be performed with other types of systems. In some embodiments, concurrent with the method steps, VCM 128A executes one current disk access operation and VCM 128B executes another current disk access operation.

As shown, a method 1600 begins at step 1601, when microprocessor-based controller 133 determines a starting time for executing the next disk access command with VCM 128A and with VCM 128B. For example, in an embodiment, the starting time is a time corresponding to a head associated with VCM 128A and/or a head associated with VCM 128B being located at a predicted seek start position (e.g., locations 1422 and 1432 in FIG. 14).

In step 1602, microprocessor-based controller 133 matches pairs of disk access operations, where each pair of disk access command includes a first disk access command from first command queue 1520 and a second disk access command from second command queue 1530. Thus, microprocessor-based controller 133 generates a group of pairs of matched disk access operations. In a given pair of matched disk access command, the second disk access command is matched with the first disk access command based on a value of first disk access timing metric 1550 for the first disk access command and a value of first disk access timing metric 1550 for the second disk access command. As described above in conjunction with FIGS. 15B-15D, such matching generally includes matching disk access commands having approximately equal values for first disk access timing metric 1550.

In step 1603, microprocessor-based controller 133 selects one pair of matched disk access commands from the group of paired disk access commands generated in step 1602. In some embodiments, the pair of matched disk access commands is selected from the group based on values of second disk access timing metric 1560 for each disk access command in the group of paired disk access commands, as described above in conjunction with FIG. 15E In step 1605, microprocessor-based controller 133 causes the selected pair of matched disk access commands to be executed at the determined starting time. Thus, in step 1605, VCM 128A executes the first disk access command in the selected pair of matched disk access commands, and VCM 128B executes the second disk access command in the selected pair of matched disk access commands. Method 1600 then returns to step 1601 for the selection of the next disk access commands to be executed with VCM 128A and with VCM 128B.

In some embodiments, after a pair of matched disk access commands is selected, a further check is performed prior to executing the pair of matched disk access commands. Specifically, in such embodiments a check is performed to determine whether one command of the pair of matched disk access commands has a disturbance time that coincides with a critical time of the other command of the matched disk access commands. One such embodiment is described below in conjunction with FIG. 17.

Figure 17:
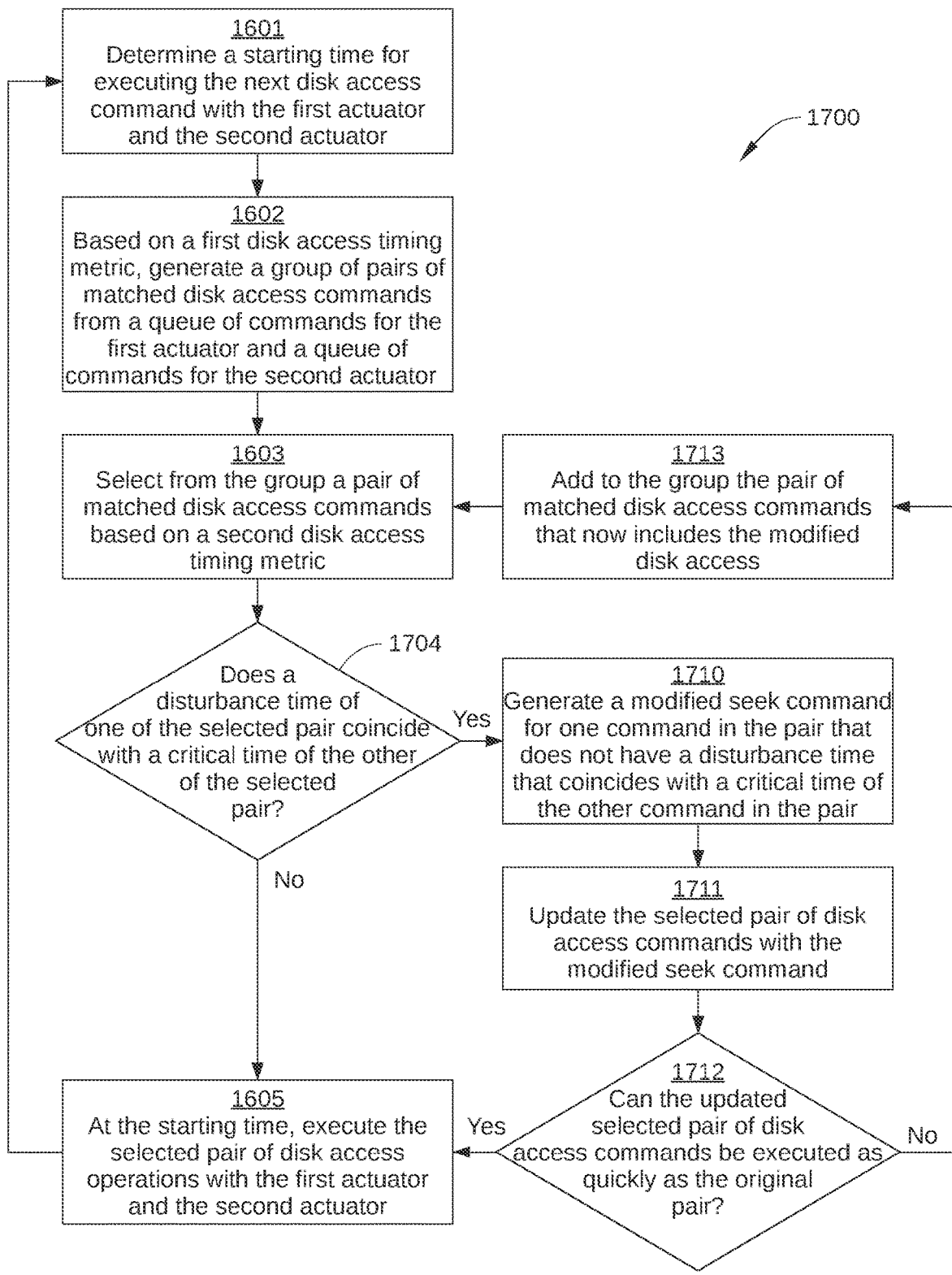
FIG. 17 sets forth a flowchart of method steps for selecting and executing disk access operations in a disk drive that includes a first actuator having a first head and a second actuator having a second head, according to an embodiment.

FIG. 17 sets forth a flowchart of method steps for selecting and executing disk access operations in a disk drive that includes a first actuator having a first head and a second actuator having a second head, according to an embodiment. Although the method steps are described in conjunction with HDD 100 in FIGS. 1-15, persons skilled in the art will understand that the method steps may be performed with other types of systems. In some embodiments, concurrent with the method steps, VCM 128A executes one current disk access operation and VCM 128B executes another current disk access operation. Steps of method 1700 that.

As shown, a method 1700 begins at step 1601. Steps 1601-1605 of method 1700 are substantially similar to the corresponding steps in method 1600, and description thereof is omitted for brevity.

In step 1704, microprocessor-based controller 133 determines whether a disturbance time of each disk access command in the selected pair of matched disk access commands (selected in step 1603) coincides with at least a portion of a critical time of the other disk access command in the selected pair of matched disk access commands. If no, method 1700 proceeds to step 1605; if yes, method 1700 proceeds to step 1710.

In step 1605, microprocessor-based controller 133 causes the selected pair of matched disk access commands to be executed at the determined starting time. Method 1700 then returns to step 1601 for the selection of the next disk access commands to be executed with VCM 128A and with VCM 128B.

Step 1710 is performed when a disturbance time of a disk access command in the selected pair of matched disk access commands is determined to coincide with at least a portion of a critical time of the other disk access command. In step 1710, microprocessor-based controller 133 generates a modified seek operation for the disk access command that includes the disturbance time. Specifically, a seek operation is modified so that the modified seek operation does not have a disturbance time that coincides with the critical time of the other disk access command in the selected pair of matched disk access commands. For example, the seek operation can be modified using techniques described above in conjunction with FIGS. 4-12 for seek scheduling based on aggressor operation disturbance times.

In step 1711, microprocessor-based controller 133 updates the selected pair of matched disk access commands with the modified seek command. Thus, one disk access command in the selected pair includes the modified seek command, so that no disturbance time of that disk access command coincides with a critical time of the other disk access command in the selected pair.

In step 1712, microprocessor-based controller 133 determines whether the updated selected pair of matched disk access commands can be executed as quickly as the original selected pair of matched disk access commands selected in step 1603. That is, microprocessor-based controller 133 determines whether the modified seek command has slowed the execution of the selected pair of matched disk access commands. If the updated selected pair of matched disk access commands can be executed as quickly as the original selected pair of matched disk access commands, method 1600 proceeds to step 1605; if the updated selected pair of matched disk access commands cannot be executed as quickly as the original selected pair of matched disk access commands, method 1600 proceeds to step 1713.

In step 1713, microprocessor-based controller 133 updates the group of pairs of matched disk access commands generated in step 1602. Specifically, the group of pairs of matched disk access command is updated to include the updated selected pair of matched disk access commands generated in step 1711, while the corresponding selected pair of matched disk access commands (selected in step 1603) is removed from the group.

It is noted that the selected pair of matched disk access commands that is removed from the group in step 1713 is the selected pair of matched disk access commands that was determined in the most recent iteration of step 1704 to include a first disk access command with a disturbance time that coincides with a critical time of a second disk access command in the pair. Consequently, the removed pair of matched disk access commands is no longer considered as an option in future iterations of step 1603. It is further noted that, in some instances, multiple iterations of the steps 1603, 1704, and 1710-1713 can occur when multiple pairs of matched disk access commands each include a first disk access command with a disturbance time that coincides with a critical time of a second disk access command in the pair. In such instances, the group of pairs of matched disk access commands generated in step 1602 will become populated with updated selected pairs of matched disk access commands, which do not include a first disk access command with a disturbance time that coincides with a critical time of a second disk access command in the pair. Upon termination of method 1700, the updated selected pairs of matched disk access commands are no longer retained in the group. As a result, in a subsequent execution of method 1700, a new group of pairs of matched disk access command is generated in step 1603 based on the newly determined values for first disk access timing metric 1550 and second disk access timing metric 1560 for the disk access commands.

While the foregoing is directed to embodiments of the present invention, other and further embodiments of the invention may be devised without departing from the basic scope thereof, and the scope thereof is determined by the claims that follow.

What is claimed is:

1. A disk drive comprising:
a first actuator that controls an arm having a first head and extending over a first surface of a plurality of disk surfaces;
a second actuator that controls an arm having a second head and extending over a second surface of a plurality of disk surfaces other than the first surface; and
a controller configured to:
control the first actuator to start a first disk access operation; and
while the first actuator is moving in connection with the first disk access operation,
select a second disk access operation from a queue of operations to be performed by the second actuator,
determine that a disturbance time of the second disk access operation coincides with at least a portion of a critical time of the first disk access operation,
in response to determining that the disturbance time coincides with the at least a portion of the critical time, generate a modified second disk access operation that does not include the disturbance time that coincides with the at least a portion of the critical time of the first disk access operation, select as an operation for execution either the modified second disk access operation or a third disk access operation from the queue of operations to be performed by the second actuator, and
execute the operation for execution.

2. The disk drive according to claim 1, wherein the second actuator is driven by a current according to an input current profile that includes:
an acceleration increase segment in which a positive current is supplied and increased over time,
an acceleration decrease segment in which the positive current is decreased over time,
a deceleration increase segment in which a negative current is supplied and increased over time, and
a deceleration decrease segment in which the negative current is decreased over time.

3. The disk drive according to claim 2, wherein generating the modified second disk access operation comprises reducing a slope of the positive current supplied in the acceleration increase segment.

4. The disk drive according to claim 3, wherein
the input current profile further includes a constant acceleration segment between the acceleration increase segment and the acceleration decrease segment, and
generating the modified second disk access operation comprises reducing a duration of the constant acceleration segment.

5. The disk drive according to claim 3, wherein
the input current profile further includes a constant acceleration segment between the acceleration increase segment and the acceleration decrease segment, and
generating the modified second disk access operation comprises:
reducing a maximum value of the positive current supplied in the acceleration increase segment,
increasing a duration of the constant acceleration segment, and
reducing a slope of the positive current supplied in the acceleration decrease segment.

6. The disk drive according to claim 2, wherein generating the modified second disk access operation comprises reducing a slope of the negative current supplied in the deceleration increase segment.

7. The disk drive according to claim 6, wherein generating the modified second disk access operation comprises reducing a slope of the positive current supplied in each of the acceleration increase segment and the acceleration decrease segment and a slope of the negative current supplied in the deceleration decrease segment.

8. The disk drive according to claim 1, wherein executing the operation for execution comprises executing the operation for execution prior to executing any other disk access operation from the queue of operations to be performed by the second actuator.

9. The disk drive according to claim 1, wherein the second disk access operation has an execution start time that occurs before an execution start time of the third disk access operation.

10. The disk drive according to claim 9, wherein the execution start time of the second disk access operation corresponds to a first time at which the second head passes over an initial target sector of the second disk access operation upon completion of a disk operation currently being performed by the second actuator and the execution start time of the third disk access operation corresponds to a first time at which the second head passes over an initial target sector of the third disk access operation upon completion of the disk operation currently being performed by the second actuator.

11. The disk drive according to claim 1, wherein the first disk access operation comprises at least one of seeking the first head to a target track of the first disk access operation and positioning the first head over the target track.

12. The disk drive according to claim 1, wherein selecting as the operation for execution either the modified second disk access operation or the third disk access operation comprises:
determining that an execution start time of the second disk access operation occurs during a seek operation of the modified second disk access operation; and
in response, selecting the third disk access operation as the operation for execution.

13. The disk drive according to claim 1, wherein selecting as the operation for execution either the modified second disk access operation or the third disk access operation comprises:
determining that an execution start time of the second disk access operation occurs during a seek operation of the modified second disk access operation;
in response, generating the third disk access operation by adding a disk access execution delay to the execution start time of the second disk access operation; and
selecting the third disk access operation as the operation for execution.

14. The disk drive of claim 13, wherein adding the disk access execution delay to the execution start time of the second disk access operation comprises rotating the second surface until the second head is circumferentially colocated with an initial target sector of the second disk access operation while the second head is positioned over a target track of the second disk access operation.

15. The disk drive according to claim 1, wherein the critical time of the first disk access operation comprises one of a time interval during which data are being read from the first surface with the first head and a time interval during which data are being written to the first surface with the first head.

16. A method of selecting and executing disk access commands in a disk drive that includes a first actuator that controls an arm having a first head and a second actuator that controls an arm having a second head, the method comprising:
controlling the first actuator to start a first disk access operation; and
while the first actuator is moving in connection with the first disk access operation,
selecting a second disk access operation from a queue of operations to be performed by the second actuator,
determining that a disturbance time of the second disk access operation coincides with at least a portion of a critical time of the first disk access operation,
in response to determining that the disturbance time coincides with the at least a portion of the critical time, generating a modified second disk access operation that does not include the disturbance time that coincides with the at least a portion of the critical time of the first disk access operation,
selecting as an operation for execution either the modified second disk access operation or a third disk access operation from the queue of operations to be performed by the second actuator, and
executing the operation for execution.

17. The method according to claim 16, wherein the second actuator is driven by a current according to an input current profile that includes:
an acceleration increase segment in which a positive current is supplied and increased over time,
an acceleration decrease segment in which the positive current is decreased over time,
a deceleration increase segment in which a negative current is supplied and increased over time, and
a deceleration decrease segment in which the negative current is decreased over time.

18. The method according to claim 17, wherein generating the modified second disk access operation comprises reducing a slope of the positive current supplied in the acceleration increase segment.

19. The method according to claim 18, wherein
the input current profile further includes a constant acceleration segment between the acceleration increase segment and the acceleration decrease segment, and
generating the modified second disk access operation comprises reducing a duration of the constant acceleration segment.

20. The method according to claim 18, wherein
the input current profile further includes a constant acceleration segment between the acceleration increase segment and the acceleration decrease segment, and
generating the modified second disk access operation comprises:
reducing a maximum value of the positive current supplied in the acceleration increase segment,
increasing a duration of the constant acceleration segment, and
reducing a slope of the positive current supplied in the acceleration decrease segment.

* * * * *